United States Patent
Xin

(10) Patent No.: US 12,079,662 B2
(45) Date of Patent: Sep. 3, 2024

(54) PICTURE PROCESSING METHOD, AND TASK DATA PROCESSING METHOD AND APPARATUS

(71) Applicant: TENCENT TECHNOLOGY (SHENZHEN) COMPANY LIMITED, Shenzhen (CN)

(72) Inventor: Yao Xin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1000 days.

(21) Appl. No.: 17/010,812

(22) Filed: Sep. 2, 2020

(65) Prior Publication Data
US 2020/0401829 A1    Dec. 24, 2020

Related U.S. Application Data

(63) Continuation of application No. PCT/CN2019/102587, filed on Aug. 26, 2019.

(30) Foreign Application Priority Data

Aug. 27, 2018    (CN) .......................... 201810980841.1

(51) Int. Cl.
*G06F 9/50*    (2006.01)
*G06F 9/48*    (2006.01)
(Continued)

(52) U.S. Cl.
CPC .......... *G06F 9/5027* (2013.01); *G06F 9/4881* (2013.01); *G06F 18/2163* (2023.01);
(Continued)

(58) Field of Classification Search
CPC .. G06F 9/5027; G06F 9/4881; G06F 18/2163; G06F 18/2415; G06F 2209/486;
(Continued)

(56) References Cited

U.S. PATENT DOCUMENTS 10,032,072 B1 *    7/2018    Tran .................... G06F 18/28
10,970,599 B2 *    4/2021    Ling .................... G06T 7/136
(Continued)

FOREIGN PATENT DOCUMENTS

CN    102122964 A    7/2011
CN    102497411 A    6/2012
(Continued)

OTHER PUBLICATIONS

The State Intellectual Property Office of the People's Republic of China (SIPO) Office Action 2 for for 201810980841.1 Mar. 30, 2021 14 Pages (including translation).

(Continued)

*Primary Examiner* — Mia M Thomas
(74) *Attorney, Agent, or Firm* — ANOVA LAW GROUP, PLLC

(57) ABSTRACT

A picture processing method is provided for a computer device. The method includes obtaining a to-be-processed picture; extracting a text feature in the to-be-processed picture using a machine learning model; and determining text box proposals at any angles in the to-be-processed picture according to the text feature. Corresponding subtasks are performed by using processing units corresponding to substructures in the machine learning model, and at least part of the processing units comprise a field-programmable gate array (FPGA) unit. The method also includes performing rotation region of interest (RROI) pooling processing on each text box proposal, and projecting the text box proposal onto a feature graph of a fixed size, to obtain a text box feature graph corresponding to the text box proposal; and recognizing text in the text box feature graph, to obtain a text recognition result.

11 Claims, 13 Drawing Sheets

(51) Int. Cl.
  *G06F 18/21* (2023.01)
  *G06F 18/2415* (2023.01)
  *G06V 10/24* (2022.01)
  *G06V 10/426* (2022.01)
  *G06V 10/82* (2022.01)
  *G06V 10/94* (2022.01)
  *G06V 20/62* (2022.01)
  *G06V 30/148* (2022.01)
  *G06V 30/19* (2022.01)
  *G06N 20/00* (2019.01)

(52) U.S. Cl.
  CPC ........ *G06F 18/2415* (2023.01); *G06V 10/242* (2022.01); *G06V 10/426* (2022.01); *G06V 10/82* (2022.01); *G06V 10/955* (2022.01); *G06V 20/63* (2022.01); *G06V 30/153* (2022.01); *G06V 30/19153* (2022.01); *G06F 2209/486* (2013.01); *G06N 20/00* (2019.01)

(58) Field of Classification Search
  CPC .......... G06F 2209/5018; G06F 9/3818; G06V 10/242; G06V 10/426; G06V 10/82; G06V 10/955; G06V 20/63; G06V 30/153; G06V 30/19153; G06N 20/00; G06N 3/045; G06N 3/063; Y02D 10/00
  See application file for complete search history.

(56) References Cited

U.S. PATENT DOCUMENTS

| | | | | |
|---|---|---|---|---|
| 11,341,368 | B2* | 5/2022 | Yao | G06N 3/092 |
| 11,449,706 | B2* | 9/2022 | Gudovskiy | G06N 7/01 |
| 11,501,477 | B2* | 11/2022 | Kumawat | G06T 11/60 |
| 11,531,565 | B2* | 12/2022 | Brady | G06F 9/5016 |
| 2016/0220835 | A1* | 8/2016 | Ben-Haim | A61B 6/037 |
| 2018/0150298 | A1* | 5/2018 | Balle | G06F 3/0608 |
| 2018/0189604 | A1* | 7/2018 | Zhang | G06V 30/1916 |
| 2019/0042234 | A1* | 2/2019 | Bernat | H04L 69/22 |
| 2019/0294469 | A1* | 9/2019 | Voss | G06F 9/4881 |
| 2020/0202068 | A1* | 6/2020 | Han | G06V 20/62 |
| 2020/0401829 | A1* | 12/2020 | Xin | G06F 18/2415 |
| 2021/0103436 | A1* | 4/2021 | Thurimella | G06F 8/65 |
| 2021/0255894 | A1* | 8/2021 | Horie | G06F 12/0253 |
| 2023/0004747 | A1* | 1/2023 | Zhu | G06N 3/0464 |
| 2023/0297498 | A1* | 9/2023 | Xiao | G06N 20/00 711/154 |
| 2023/0412855 | A1* | 12/2023 | Heckman | G06F 11/07 |

FOREIGN PATENT DOCUMENTS

| | | | |
|---|---|---|---|
| CN | 102594891 A | 7/2012 | |
| CN | 102903115 A | 1/2013 | |
| CN | 103593323 A | 2/2014 | |
| CN | 103996186 A | 8/2014 | |
| CN | 104299168 A | 1/2015 | |
| CN | 104866460 A | 8/2015 | |
| CN | 105956608 A | 9/2016 | |
| CN | 106326909 A | 1/2017 | |
| CN | 106845530 A | 6/2017 | |
| CN | 107133616 A | 9/2017 | |
| CN | 107391429 A | 11/2017 | |
| CN | 107392309 A | 11/2017 | |
| CN | 107832123 A | 3/2018 | |
| CN | 108229299 A | 6/2018 | |
| CN | 108229303 A | 6/2018 | |
| CN | 109325494 A | 2/2019 | |
| IN | 107463990 A | 12/2017 | |
| WO | WO-2020043057 A1 * | 3/2020 | G06F 9/3818 |
| WO | WO-2023018477 A1 * | 2/2023 | G06F 15/8023 |

OTHER PUBLICATIONS

The World Intellectual Property Organization (WIPO) International Search Report for PCT/CN2019/102587 Oct. 28, 2019 6 Pages (including translation).
The European Patent Office (EPO) Extended European Search Report for 19854472.8 Sep. 27, 2021 10 Pages (including translation).
Roberto Dicecco et al, "Caffeinated FPGAs: FPGA framework For Convolutional Neural Networks," 2016 International Conference on Field-Programmable Technology (FPT), IEEE, Dec. 7, 2016 (Dec. 7, 2016). 4 pages.
Marco Bacis et al., "A Pipelined and Scalable Dataflow Implementation of Convolutional Neural Networks on FPGA," 2017 IEEE International Parallel and Distributed Processing Symposium Workshops (IPDPSW). IEEE, May 29, 2017 (May 29, 2017), pp. 90-97. 8 pages.
Jianqi Ma et al, "Arbitrary-Oriented Scene Text Detection via Rotation Proposals," arXiv:1703.01086, Mar. 25, 2017. 9 pages.
The State Intellectual Property Office of the People's Republic of China (SIPO) Office Action 1 for 201810980841.1 Sep. 27, 2020 13 Pages (including translation).
Xiangrong Chen et al., "Detecting and Reading Text in Natural Scenes," In CVPR 2004. 8 pages.
Lalitha Agnihotri et al., "Text detection for video analysis. Content-Based Access of Image and Video Libraries," IEEE Workshop on CBAIVL 1999. 5 pages.
Chuang Li et al., "Automatic text location in natural scene images," In ICDAR, 1069-1073, 2001. 5 pages.
J. Matas et al., "Robust wide-baseline stereo from maximally stable extremal regions," Image and Vision Computing, 22(10), 761-767, 2004. 7 pages.
Boris Epshtein et al., "Detecting text in natural scenes with stroke width transform," In CVPR, 2963-2970, 2010. 3 pages.
Jung-Jin Lee et al., "Adaboost for text detection in natural scene," In ICDAR, 429-434, 2011. 6 pages.
Adam Coates et al., "Text detection and character recognition in scene images with unsupervised feature earning," In ICDAR. 440-445, 2011. 6 pages.
Cong Yao et al., "Detecting texts of arbitrary orientations in natural images," In CVPR, 1083-1090, 2012. 8 pages.
Zhuoyao Zhong et al., "Deeptext: A unified framework for text proposal generation and text detection in natural images," arXiv:1605.07314, 2016. 12 pages.
Zhi Tian et al., "Detecting text in natural image with connectionist text proposal network," In ECCV, 56-72, 2016. 17 pages.
Jianqi Ma et al., "Arbitrary-Oriented Scene Text Detection via Rotation Proposals," arXiv, 2017. 12 pages.
Yingying Jiang et al., "R2CNN: Rotational Region CNN for Orientation Robust Scene Text Detection," arXi:1706.09579, 2017. 8 pages.
Cong Yao et al., "Scene text detection via holistic, multi-channel prediction," arXiv:1606.09002, 2016. 10 pages.
Zheng Zhang et al., "Multi-oriented text detection with fully convolutional networks," In CVPR, 4159-4167, 2016. 9 pages.
Xinyu Zhou et al., "East: An efficient and accurate scene text detector," In CVPR, 5551-5560, 2017. 10 pages.
Wenhao He et al., "Deep Direct Regression for Multi-Oriented Scene Text Detection," In ICCV, 745-753, 2017. 9 pages.
Baoguang Shi et al., "Detecting Oriented Text in Natural Images by Linking Segments," In CVPR, 3482-3490, 2017. 9 pages.
Joseph Redmon et al., "You only look once: Unified, real-time object detection," In CVPR, 779-788, 2016. 10 pages.
Wei Liu et al., "SSD: Single shot multibox detector," In ECCV 2016. 17 pages.
Shaoqing Ren et al., "Faster R-CNN: Towards real-time object detection with region proposal networks," In NIPS 2015. 14 pages.
Jifeng Dai et al., "R-fcn: Object detection via region-based fully convolutional networks," In NIPS, 2016 9 pages.
The European Patent Office (EPO) The Extended European Search Report for 19854472.8 Oct. 16, 2023 6 Pages.
Song Linghao et al: "PipeLayer: A Pipelined ReRAM-Based Accelerator for Deep Learning", 2017 IEEE International Symposium On

(56) References Cited

OTHER PUBLICATIONS

High Performance Computer Architecture (HPCA) IEEE, Feb. 4, 2017 (Feb. 4, 2017), pp. 541-552.

\* cited by examiner

PICTURE PROCESSING METHOD, AND TASK DATA PROCESSING METHOD AND APPARATUS

RELATED APPLICATIONS

This application is a continuation application of PCT Patent Application No. PCT/CN2019/102587, filed on Aug. 26, 2019, which claims priority to Chinese Patent Application No. 201810980841.1, entitled "PICTURE PROCESSING METHOD AND TASK DATA PROCESSING METHOD AND APPARATUS" and filed with the National Intellectual Property Administration, PRC on Aug. 27, 2018, which is incorporated herein by reference in its entirety.

FIELD OF THE TECHNOLOGY

This application relates to the field of data processing and, in particular, to a picture processing method and a task data processing method and apparatus.

BACKGROUND OF THE DISCLOSURE

With the rapid development of computing technology, an increasingly large amount of data needs to be processed by computers. Especially with the rapid increase of data volume, the requirement of data processing efficiency becomes increasingly high. For example, in the field of scene text recognition, text detection is a precondition of the scene text recognition, and a problem that needs to be resolved is how to accurately locate and recognize a character in a picture of a complex scene with a lot of clutter. Due to the complexity of the background, the variability of light, and the unpredictability of fonts, the text detection faces a great challenge.

For example, in terms of hardware, picture data processing and text detection are usually performed by using a central processing unit (CPU) or a graphics processing unit (GPU). The CPU uses serial processing. That is, during processing, the CPU needs to complete the processing of a piece of task data and obtain an execution result corresponding to the piece of task data before the CPU can continue to execute a next piece of task data. In this case, compared with a large amount of task data, the efficiency of task data processing is relatively low. Meanwhile, GPU processing requires high costs and has huge power consumption.

The disclosed methods and systems are directed to solve one or more problems set forth above and other problems.

SUMMARY

One aspect of the present disclosure includes a picture processing method for a computer device. The picture processing method includes obtaining a to-be-processed picture; extracting a text feature in the to-be-processed picture using a machine learning model; and determining text box proposals at any angles in the to-be-processed picture according to the text feature. Corresponding subtasks are performed by using processing units corresponding to substructures in the machine learning model, and at least part of the processing units comprise a field-programmable gate array (FPGA) unit. The method also includes performing rotation region of interest (RROI) pooling processing on each text box proposal, and projecting the text box proposal onto a feature graph of a fixed size, to obtain a text box feature graph corresponding to the text box proposal; and recognizing text in the text box feature graph, to obtain a text recognition result.

Another aspect of the present disclosure includes a task data processing method for a computer device. The method includes: obtaining a plurality of pieces of task data; successively performing, for each piece of task data in an order of substructures in a machine learning model, subtasks of corresponding substructures by using processing units corresponding to the substructures, at least part of the processing units comprising a field-programmable gate array (FPGA) unit; and performing, in a case that the processing unit is in an idle state during the processing of each processing unit, a subtask corresponding to a next piece of task data in parallel.

Another aspect of the present disclosure includes a task-data processing apparatus. The task-data processing apparatus includes at least a task scheduling unit and a field-programmable gate array (FPGA) unit that are connected to each other. The task scheduling unit is configured to: obtain a plurality of pieces of task data; successively perform, for each piece of task data in an order of substructures in a machine learning model, subtasks of corresponding substructures by using processing units corresponding to the substructures, at least part of the processing units comprising the FPGA unit; and perform, in a case that the processing unit is in an idle state during the processing of each processing unit, a subtask corresponding to a next piece of task data in parallel.

Other aspects of the present disclosure can be understood by those skilled in the art in light of the description, the claims, and the drawings of the present disclosure.

DETAILED DESCRIPTION

To make the objectives, technical solutions, and advantages of the present disclosure clearer, the following further describes implementations of the present disclosure in detail with reference to the accompanying drawings.

To make the objectives, technical solutions, and advantages of the present disclosure clearer and more comprehensible, the following further describes the present disclosure in detail with reference to the accompanying drawings and embodiments. It is to be understood that the specific embodiments described herein are only used for explaining the present disclosure, and are not used for limiting the present disclosure.

Figure 1:
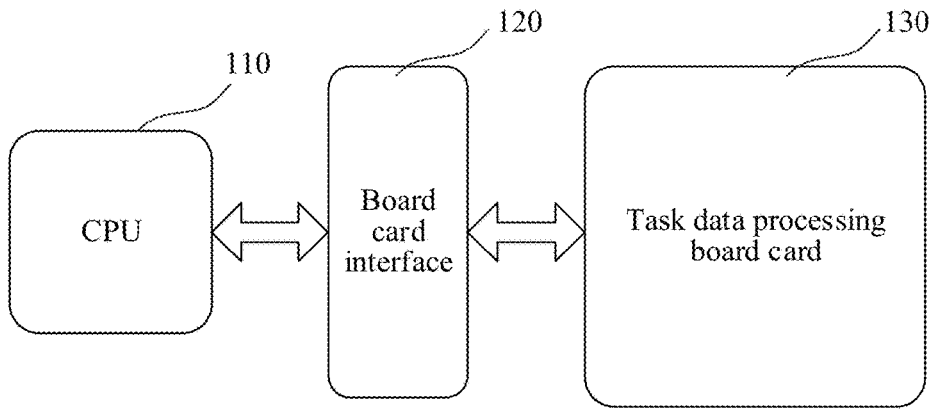
FIG. 1 is a diagram of an application scenario of a task data processing method according to an embodiment of the present disclosure.

FIG. 1 is a diagram of an application scenario of a task data processing method according to an embodiment of the present disclosure. Referring to FIG. 1, the application scenario includes a CPU 110, a board card interface 120, and a task data processing apparatus 130. The CPU 110 communicates with the task-data processing board card 130 through the board card interface 120. The board card interface 120 and the CPU 110 may be integrated on a mainboard of a computer device. The board card interface 120 may be a board card slot on the mainboard. The task-data processing board card 130 may communicate with the CPU 110 after being inserted into the board card slot. The task-data processing board card 130 is integrated with at least one FPGA unit.

Figure 2:
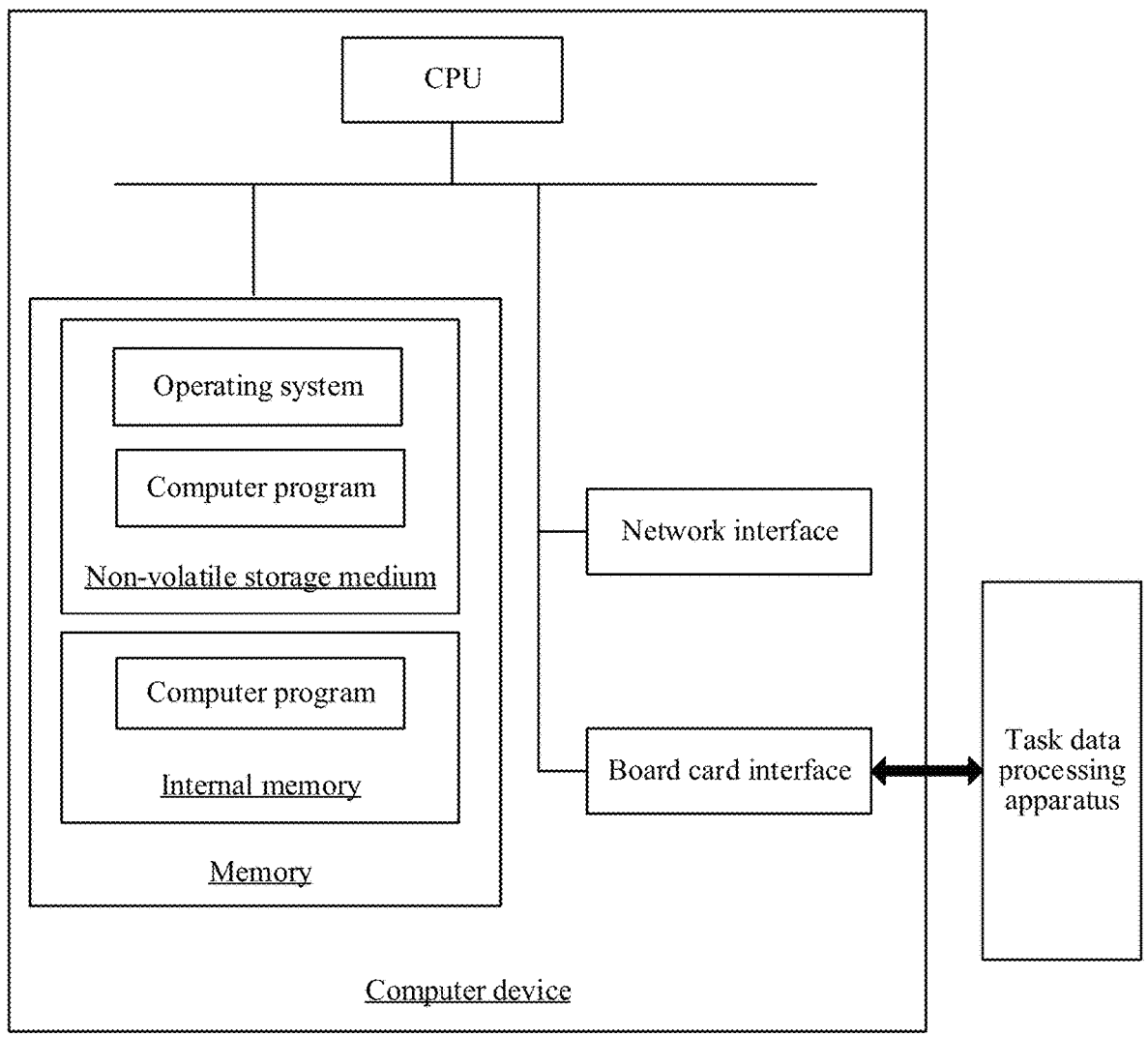
FIG. 2 is a schematic diagram of an internal structure of a computer device according to an embodiment of the present disclosure.

FIG. 2 is a schematic diagram of an internal structure of a computer device integrated with the CPU 110 and the board card interface 120 in FIG. 1. Referring to FIG. 2, the computer device includes a CPU 110, a memory, a network interface, and a board card interface 120 that are connected by a system bus, the board card interface 120 being connected to the task-data processing board card 130. The memory includes a non-transitory storage medium and an internal memory. The non-transitory storage medium of the computer device may store an operating system and a computer program. When the computer program is executed, the CPU 110 may be caused to perform the following task data processing method. The task-data processing board card 130 and the CPU 110 of the computer device are configured to provide computation and control capabilities, to support the running of the entire computer device and task-data processing board card 130. The internal memory may store a computer program. The computer program, when being executed by the CPU 110, may cause the CPU 110 to perform the following task data processing method. The network interface of the computer device is configured to perform network communication. The computer device may be a distributed server slave. The board card interface 120 may be an interface of PCIE gen3x8.

It may be understood that, the structure shown in FIG. 2 is only a block diagram of a part of a structure related to a solution of the present disclosure and does not limit the computer device to which the solution of the present disclosure is applied. Specifically, the computer device may include more or fewer members than those in FIG. 2, or include a combination of some members, or include different member layouts.

Figure 3:
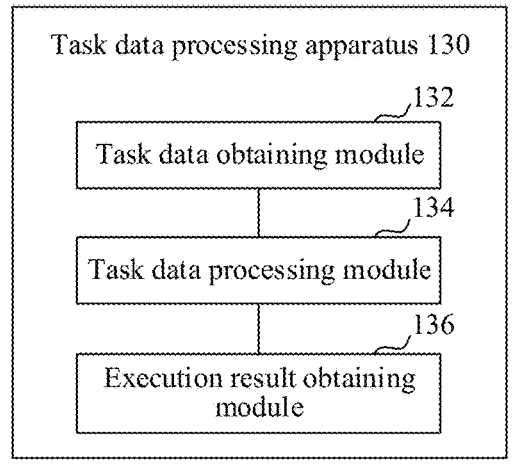
FIG. 3 is a block diagram of a task data processing apparatus according to an embodiment of the present disclosure.

As shown in FIG. 3, in an embodiment, a task-data processing board card 130 (or task-data processing apparatus 130) is provided. The apparatus specifically includes a task data obtaining module 132, a task data processing module 134, and an execution result obtaining module 136.

The task data obtaining module 132 is configured to obtain a plurality of pieces of task data.

The task data processing module 134 is configured to: successively perform, for each piece of task data in an order of substructures in a machine learning model, subtasks of corresponding substructures by using processing units corresponding to the substructures, at least part of the processing units including an FPGA unit; and perform, in a case that the processing unit is in an idle state, a subtask corresponding to a next piece of task data in parallel.

The execution result obtaining module 136 is configured to obtain a corresponding task execution result after the subtask of each piece of task data at each substructure is completed.

The computer device shown in FIG. 2 may obtain a plurality of pieces of task data by using the task data obtaining module 132 in the task-data processing board card 130 shown in FIG. 3. The computer device may successively perform, for each piece of task data in an order of substructures in a machine learning model, subtasks of corresponding substructures by using processing units corresponding to the substructures, at least part of the processing units including an FPGA unit; and perform, in a case that the processing unit is in an idle state during the processing of each processing unit, a subtask corresponding to a next piece of task data in parallel by using the task data processing module 134. The computer device may obtain a corresponding task execution result after the subtask of each piece of task data at each substructure is completed by using the execution result obtaining module 136.

Figure 4:
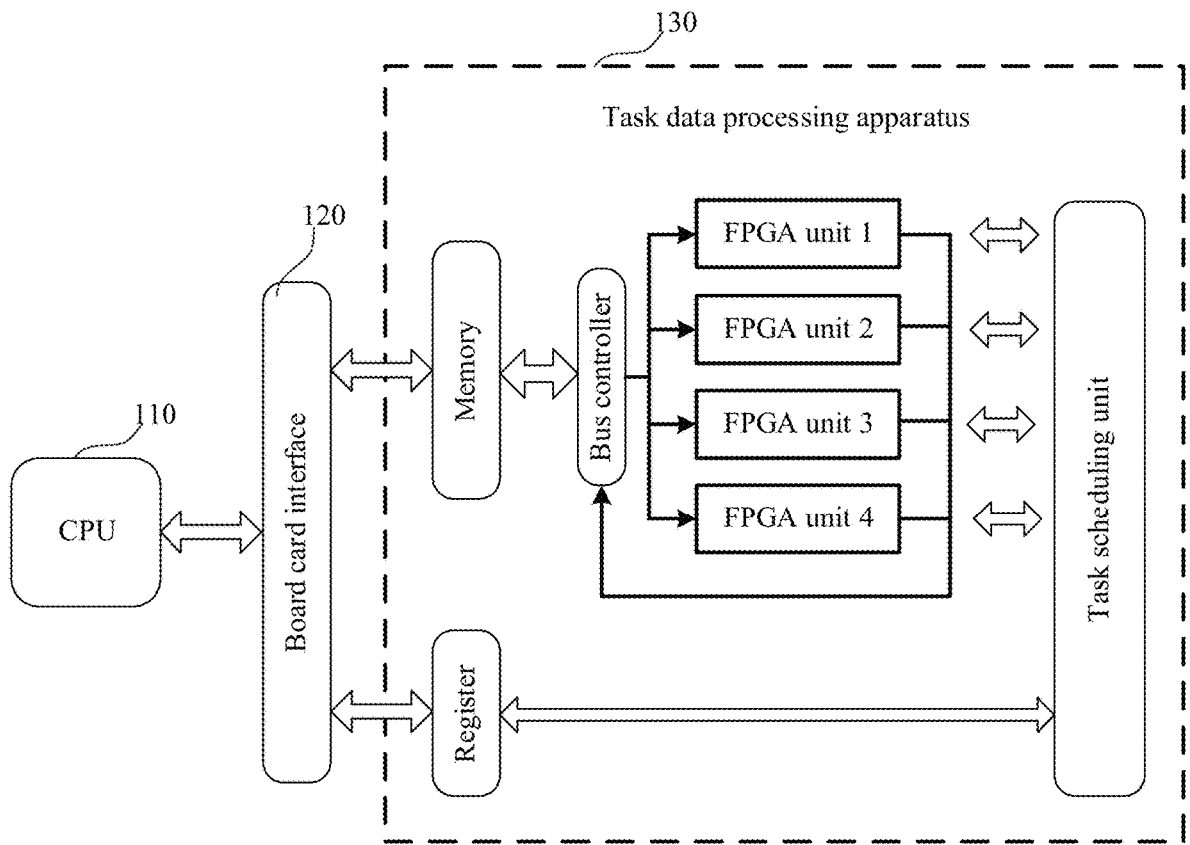
FIG. 4 is a schematic diagram of an internal structure of a task data processing apparatus according to an embodiment of the present disclosure.

As shown in FIG. 4, in another embodiment, the task-data processing board card 130 includes a task scheduling unit and one or more FPGA units, the task scheduling unit being connected to each FPGA unit. In FIG. 4, an example in which the task-data processing board card 130 includes the task scheduling unit and four FPGA units is used for description.

The task scheduling unit is configured to: obtain a plurality of pieces of task data; and successively schedule, for each piece of task data in an order of substructures in a machine learning model, processing units corresponding to substructures in the machine learning model to perform a subtask of a corresponding substructure, at least part of the processing units including one or more FPGA units.

The FPGA unit is configured to: perform, in a case that the processing unit is in an idle state during the processing of each processing unit, a subtask corresponding to a next piece of task data; and obtain and output a corresponding task execution result after a subtask of each piece of task data at each substructure is completed.

Continuing to refer to FIG. 4, in an embodiment, the task-data processing board card 130 further includes a register and a memory, the memory being connected to the FPGA unit, the register being connected to the task scheduling unit.

The task scheduling unit is further configured to read processing unit call data from the register, to successively schedule, for each piece of task data based on the processing unit call data in an order of substructures in a machine learning model, processing units corresponding to the substructures in the machine learning model to perform a subtask of a corresponding substructure.

The FPGA unit is further configured to: read task data written by the CPU 110 from the memory; perform, in a case that the processing unit is in an idle state during the processing of each processing unit, a subtask corresponding to a next piece of task data; obtain a corresponding task execution result after a subtask of each piece of task data at each substructure is completed; and store the task execution result in the memory.

Continuing to refer to FIG. 4, in an embodiment, the task-data processing board card 130 further includes a bus controller, the bus controller being connected to the memory and each FPGA unit respectively. Each FPGA unit stores the task execution result in the memory through the bus controller. The memory may be a DDR4 memory.

In an embodiment, the task-data processing board card 130 is connected to the CPU 110 by the board card interface 120, and the processing units further include the CPU 110.

Figure 5:
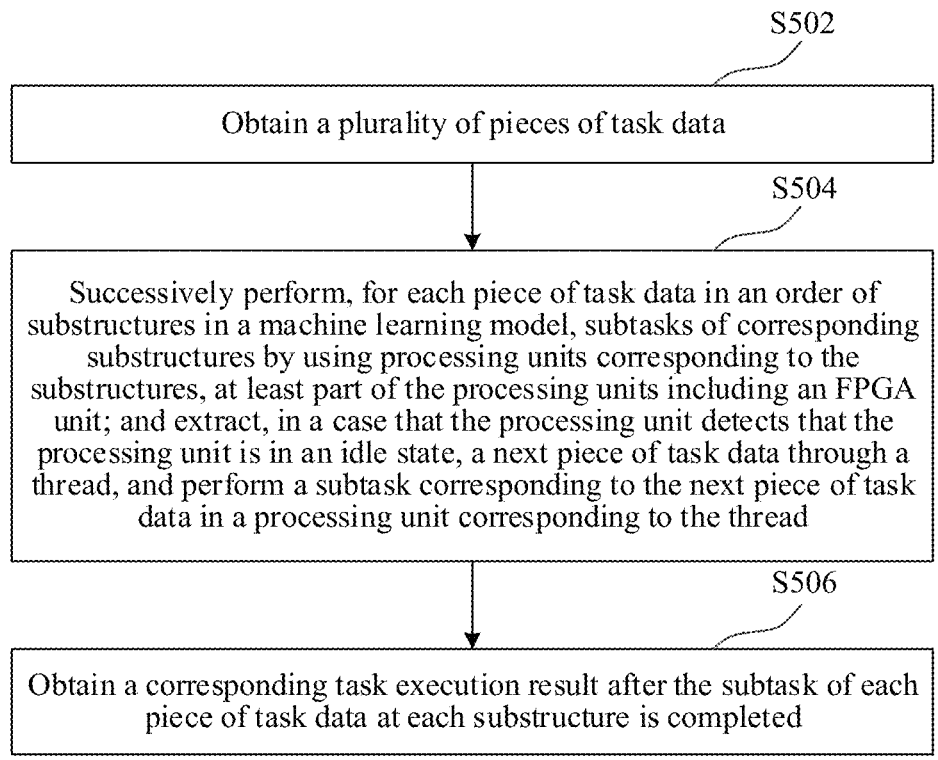
FIG. 5 is a schematic flowchart of a task data processing method according to an embodiment of the present disclosure.

As shown in FIG. 5, in an embodiment, a task data processing method is provided. The task data processing method may be applied to the task-data processing board card 130 in FIG. 1. This embodiment is described by using an example in which the method is applied to the task-data processing board card 130 in FIG. 1. Referring to FIG. 5, the task data processing method specifically includes the followings.

S502. Obtain a plurality of pieces of task data.

The task data is data corresponding to a to-be-processed task. The CPU 110 obtains the task data and transmits the task data to the task-data processing board card 130, and the task-data processing board card 130 stores the received task data. When processing the task data, the task-data processing board card 130 reads a plurality of pieces of task data from the stored task data.

In an embodiment, the CPU 110 reads the task data from a memory of a computer device and transmits the read task data to the task-data processing board card 130. The task-data processing board card 130 receives the task data transmitted by the CPU 110 and stores the task data in the memory. When processing the task data, the CPU 110 transmits a task execution instruction to the task-data processing board card 130. The task-data processing board card 130 receives the task execution instruction transmitted by the CPU 110, determines to process the task data, and reads a plurality of pieces of task data from the memory according to the task execution instruction.

When caching the task data, the task-data processing board card 130 adopts a double cache ping-pong operation, and data reading and computation are performed simultaneously to reduce the latency of two parts waiting for each other, thereby improving the processing efficiency.

Figure 6:
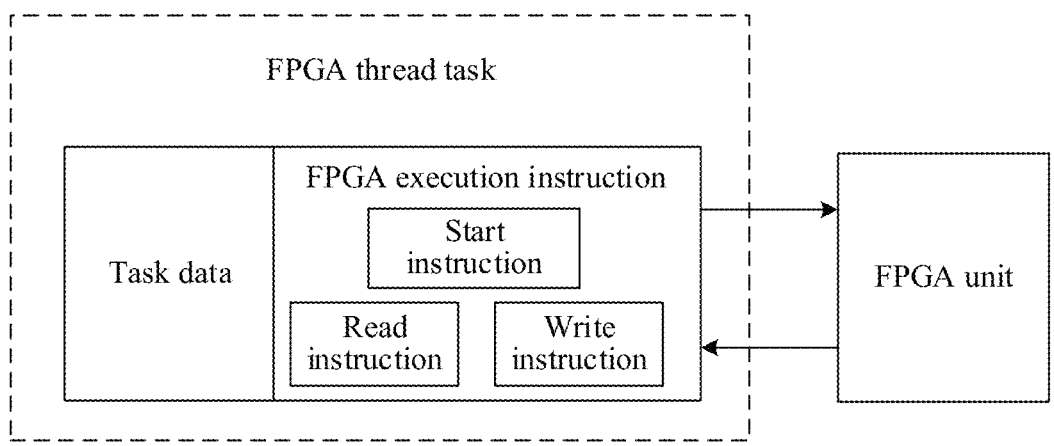
FIG. 6 is a schematic diagram of an encapsulation of task data according to an embodiment of the present disclosure.

The following is described by using FIG. 6 as an example. FIG. 6 is a schematic diagram of an encapsulation of task data according to an embodiment. After obtaining the task data, the CPU 110 encapsulates the task data into an FPGA thread task. The FPGA thread task includes the task data and an FPGA execution instruction, the FPGA execution instruction including a write instruction, a read instruction, and a start instruction. The FPGA execution instruction is used for calling an FPGA unit to process the task data. The CPU 110 puts the encapsulated FPGA thread task into a thread pool, and the task-data processing board card 130 obtains the FPGA thread task from the thread pool, and reads the task data from the FPGA thread task. The task-data processing board card 130 may also read the FPGA execution instruction from the FPGA thread task.

S504. Successively perform, for each piece of task data in an order of substructures in a machine learning model, subtasks of corresponding substructures by using processing units corresponding to the substructures, at least part of the processing units including an FPGA unit; and extract, in a case that the processing unit detects that the processing unit is in an idle state, a next piece of task data through a thread, and perform a subtask corresponding to the next piece of task data in a processing unit corresponding to the thread.

The task-data processing board card 130 includes a plurality of processing units. In one embodiment, the plurality of processing units include the FPGA unit and a CPU. The machine learning model is a pre-trained data model that processes the task data. There is a processing unit corresponding to each substructure in the machine learning model. The processing unit is configured to perform the subtask corresponding to the substructure in the corresponding machine learning model.

The task-data processing board card 130 inputs the plurality of pieces of task data into the processing units corresponding to the machine learning model, and processes the task data by using the processing units of the machine learning model.

In an embodiment, for each piece of task data, the task-data processing board card 130 performs a subtask corresponding to the task data by using the processing units in an order of substructures in the machine learning model; and during the processing of each processing unit, detects whether a subtask of a previous piece of task data at a current substructure is completed, and detects whether a subtask of a current piece of task data at a previous substructure is completed; and starts to perform, in a case that it is detected that the subtask of the previous piece of task data at the current substructure is completed and it is detected at the same time that the subtask of the current piece of task data at the previous substructure is completed, that is, a processing unit corresponding to the current substructure is in an idle state, a subtask of the current piece of task data at the current substructure.

In an embodiment, for each piece of task data, the task-data processing board card 130 inputs the task data into a processing unit corresponding to a first substructure in the machine learning model, and performs a subtask corresponding to the first substructure by using the processing unit corresponding to the first substructure according to the task data, to obtain first subtask data. The task-data processing board card 130 further inputs the first subtask data into a processing unit corresponding to a second substructure in the machine learning model, and performs a subtask corresponding to the second substructure by using the processing unit corresponding to the second substructure according to the first subtask data, to obtain second subtask data. The task-data processing board card further inputs the second subtask data into a third substructure in the machine learning model, until a task execution result outputted by the last substructure in the machine learning model is obtained.

In an embodiment, during the processing of each processing unit, the task-data processing board card 130 inputs a previous piece of task data into the processing unit corresponding to the first substructure in the machine learning model, and performs the subtask corresponding to the first substructure by using the processing unit corresponding to the first substructure according to the previous piece of task data, to obtain first subtask data corresponding to the previous piece of task data.

After the processing unit corresponding to the first substructure completes the subtask of the first substructure according to the previous piece of task data, the task-data processing board card 130 inputs the current piece of task data into the processing unit corresponding to the first substructure in the machine learning model, and performs the subtask corresponding to the first substructure by using the processing unit corresponding to the first substructure according to the current piece of task data, and at the same time, the task-data processing board card inputs the first subtask data corresponding to the previous piece of task data into the processing unit corresponding to the second substructure in the machine learning model, and performs the subtask corresponding to the second substructure by using the processing unit corresponding to the second substructure according to the first subtask data corresponding to the previous piece of task data, to obtain second subtask data corresponding to the previous piece of task data.

After the processing unit corresponding to the first substructure completes the subtask of the first substructure according to the current piece of task data to obtain first subtask data corresponding to the current piece of task data and obtain second subtask data corresponding to the previous piece of task data, the task-data processing board card 130 inputs the first subtask data corresponding to the current piece of task data into the processing unit corresponding to the second substructure in the machine learning model, and performs the subtask corresponding to the second substructure by using the processing unit corresponding to the second substructure according to the first subtask data corresponding to the current piece of task data to obtain the second subtask data corresponding to the current piece of task data. In addition, the task-data processing board card 130 inputs the second subtask data corresponding to the previous piece of task data into the processing unit corresponding to the third substructure in the machine learning model, until a task execution result corresponding to the previous piece of task data and a task execution result corresponding to the current piece of task data outputted by the last substructure in the machine learning model are obtained.

In an embodiment, S504 includes: for each piece of task data, reading, by the task-data processing board card 130, processing unit call data from a register; writing, by the CPU 110, the processing unit call data into the register; and successively calling, based on the processing unit call data in an order of substructures in the machine learning model, processing units corresponding to the substructures to perform a subtask of a corresponding substructure.

The processing unit call data is data required for the task-data processing board card 130 to call the processing unit. The processing unit call data may include a processing unit identifier, and may further include an instruction used for calling the processing unit. The instruction used for calling the processing unit may include at least one of a unit write instruction, a unit read instruction, and a unit execution instruction.

Further, the CPU 110 writes processing unit call data corresponding to each piece of task data into the register. The task-data processing board card 130 reads the processing unit call data corresponding to each piece of task data from the register, extracts the processing unit identifier in the processing unit call data, and successively calls, based on a processing unit corresponding to the extracted processing unit identifier in an order of substructures in a machine learning model, processing units corresponding to the substructures to perform a subtask of a corresponding substructure.

In an embodiment, S504 further includes: waiting for, in a case that all the processing units are not in an idle state, a processing unit corresponding to the subtask of the current substructure to be released, for example, waiting for, in a case that a subtask of a previous piece of task data at a current substructure is not completed and a subtask of a current piece of task data at a previous substructure is completed during the processing of each processing unit, the processing unit corresponding to the subtask of the current substructure to be released; and calling, in a case that the processing unit corresponding to the subtask of the current substructure is released, the processing unit corresponding to the subtask of the current substructure to perform a subtask of the current piece of task data at the current substructure.

Figure 7:
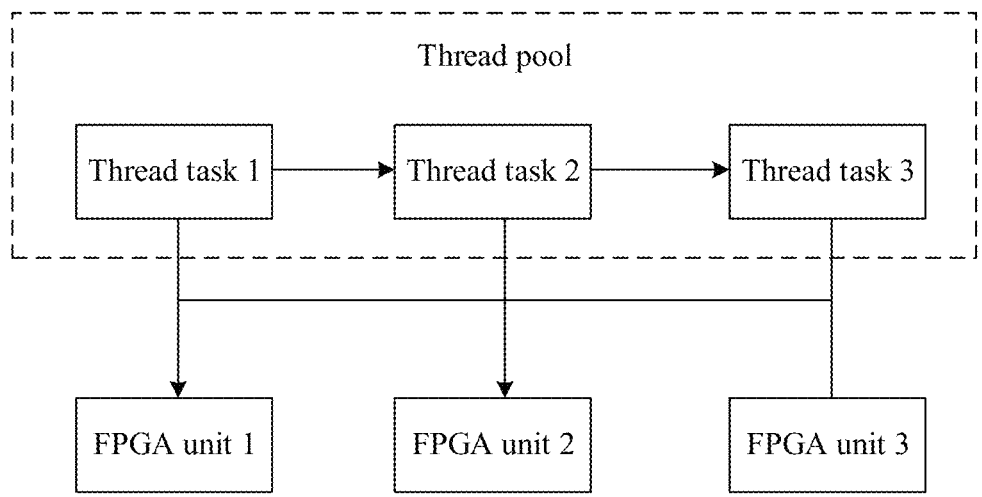
FIG. 7 is a schematic diagram of a parallel execution of a plurality of thread tasks according to an embodiment of the present disclosure.

FIG. 7 is a schematic diagram of a parallel execution of a plurality of thread tasks according to an embodiment. The task-data processing board card 130 reads a thread task 1, a thread task 2, and a thread task 3 from a thread pool. The thread task 1, the thread task 2, and the thread task 3 are connected in sequence. When the FPGA unit processes the thread task 1, the thread task 2, and the thread task 3, an output of an FPGA unit 1 is used as an input of an FPGA unit 2, an output of the FPGA unit 2 is used as an input of an FPGA unit 3. That is, the FPGA unit 1, the FPGA unit 2, and the FPGA unit 3 are processed in a pipelining manner, and subtasks performed by the FPGA units are different. The thread tasks (or the threads) may call the FPGA units independently, so that different FPGA units may run different thread tasks at the same time, thereby improving the throughput.

Figure 8:
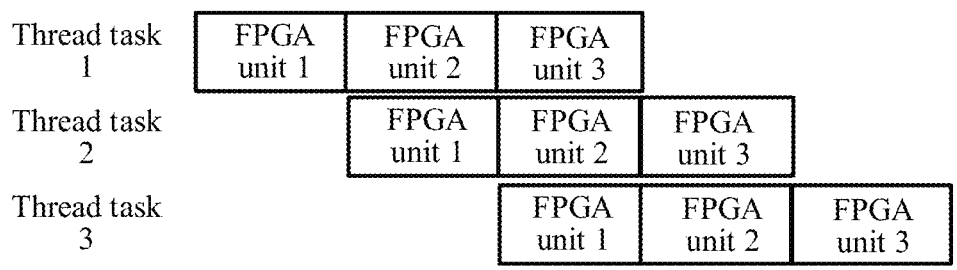
FIG. 8 is a sequence diagram of a parallel execution of a plurality of thread tasks according to an embodiment of the present disclosure.
Figure 9:
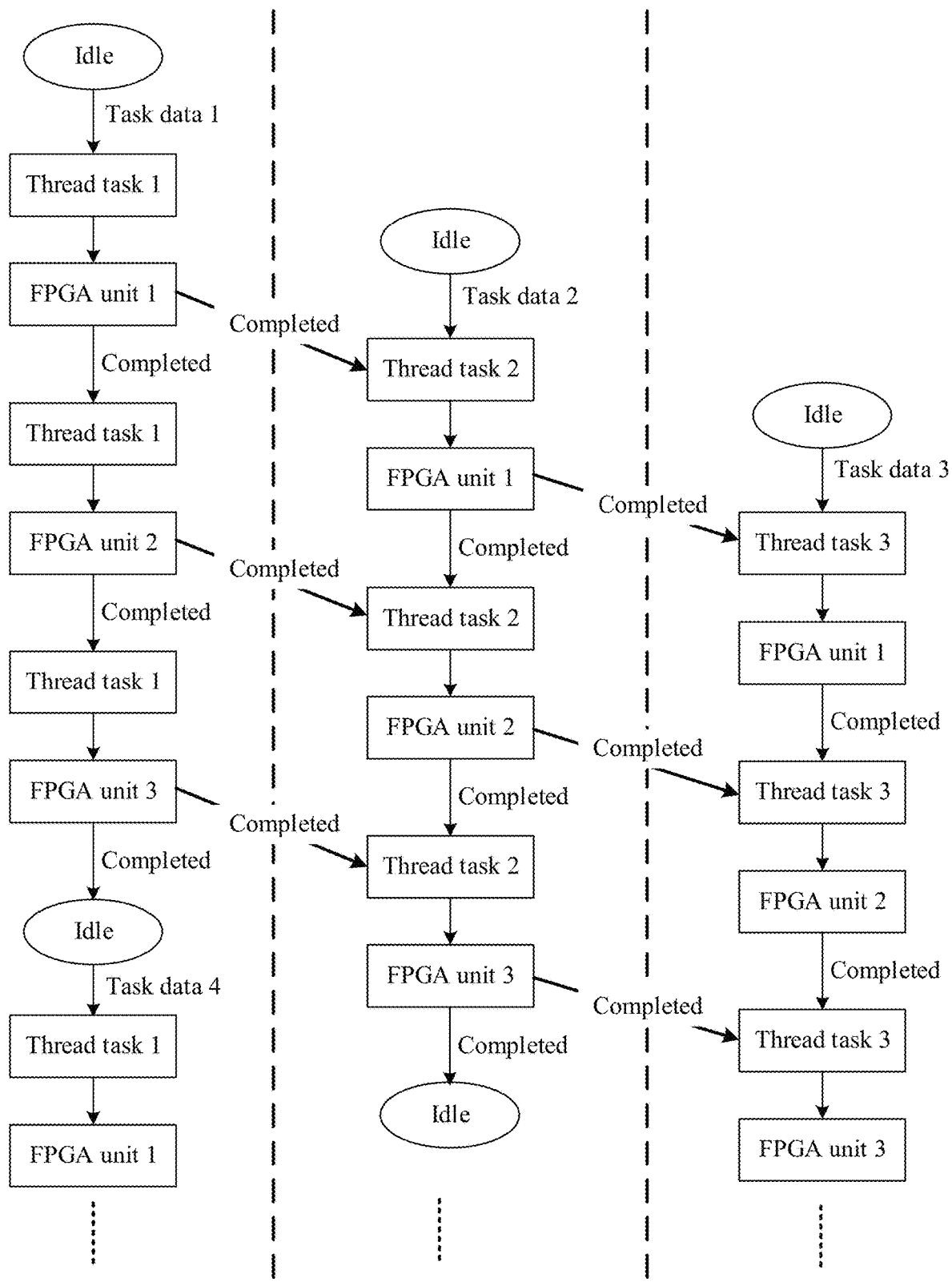
FIG. 9 is a sequence diagram of a parallel execution of a plurality of thread tasks according to an embodiment of the present disclosure.

FIG. 8 and FIG. 9 are sequence diagrams of a parallel execution of a plurality of thread tasks according to an embodiment. The thread task corresponding to the task data needs to perform corresponding subtasks by using the FPGA unit 1, the FPGA unit 2, and the FPGA unit 3 successively to obtain a task execution result of the task data. Referring to FIG. 8 and FIG. 9, when the FPGA unit 1, the FPGA unit 2, and the FPGA unit 3 are in an idle state, the thread task 1 obtains task data 1, and calls the FPGA unit 1 to perform a subtask 1 of the task data 1. When the FPGA unit 1 completes the subtask 1 of the thread task 1, the thread task 1 calls the FPGA unit 2 to perform a subtask 2. At the same time, the thread task 2 obtains task data 2, and calls the FPGA unit 1 to perform a subtask 1 of the thread task 2.

When the FPGA unit 2 completes the subtask 2 of the thread task 1 and the FPGA unit 1 completes the subtask 1 of the thread task 2, the thread task 1 calls an FPGA unit 3 to perform a subtask 3, the thread task 2 calls the FPGA unit 2 to perform the subtask 2 at the same time, and the thread task 3 obtains task data 3 and calls the FPGA unit 1 to perform the subtask 1 at the same time. When the FPGA unit 3 completes the subtask 3 of the thread task 1 and the FPGA unit 2 completes the subtask 2 of the thread task 2, the thread task 2 calls the FPGA unit 3 to perform the subtask 3. In addition, when the FPGA unit 1 completes a subtask 1 of the thread task 3, the thread task 3 calls the FPGA unit 2 to perform the subtask 2, and the thread task 1 may also obtain task data 4 and call the FPGA unit 1 to perform the subtask 1, until task execution results corresponding to the task data are obtained by calling the FPGA units through the thread tasks. A quantity of the thread tasks may be set to n, n being a positive integer.

Figure 10:
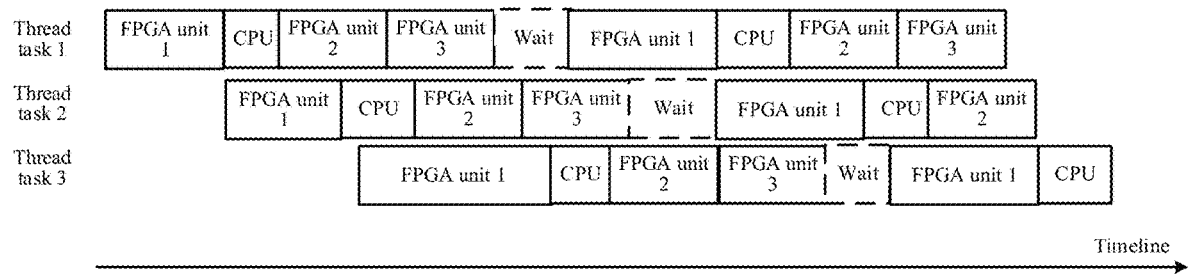
FIG. 10 is a schematic diagram of a CPU and an FPGA unit processing tasks in parallel according to an embodiment of the present disclosure.

In an embodiment, the plurality of processing units may include the CPU 110 and the FPGA units. FIG. 10 is a schematic diagram of a CPU 110 and an FPGA unit processing tasks in parallel according to an embodiment. As shown in FIG. 10, the thread task 1, the thread task 2, and the thread task 3 call the processing units in the same order. The thread task 1 calls the FPGA unit 1, and after the thread task 1 releases the FPGA unit 1, the thread task 1 calls the CPU 110, and the thread task 2 calls the FPGA unit 1. After the thread task 1 releases the CPU, the thread task 1 calls the FPGA unit 2. After the thread task 1 releases the CPU 110 and the thread task 2 releases the FPGA unit 1, the thread task 2 calls the CPU 110, and the thread task 3 calls the FPGA unit 1. After the thread task 1 releases the FPGA unit 2, the thread task 1 calls the FPGA unit 3. After the thread task 1 releases the FPGA unit 2 and the thread task 2 releases the CPU 110, the thread task 2 calls the FPGA unit 2. After the thread task 2 releases the CPU 110 and the thread task 3 releases the FPGA unit 1, the thread task 3 calls the CPU 110. After the thread task 1 releases the FPGA unit 3, wait for the thread task 3 to release the FPGA unit 1. After the FPGA unit 1 is released, the thread task 3 calls the FPGA unit 1 again. Therefore, it is ensured that the thread tasks are process in parallel, until task execution results corresponding to the thread tasks processed in parallel are obtained.

S506. Obtain a corresponding task execution result after the subtask of each piece of task data at each substructure is completed.

For each piece of task data, after detecting that the subtasks of the substructures in the machine learning model are completed, the task-data processing board card 130 obtains a task execution result outputted by a processing unit corresponding to the last substructure in the machine learning model, so as to obtain a task execution result corresponding to each piece of task data.

In one embodiment, after the plurality of pieces of task data are obtained, for each piece of task data, a subtask of a corresponding substructure is performed successively by using processing units corresponding to the substructures in an order of the substructures in the machine learning model respectively, each processing unit corresponding to a substructure of a machine learning model, at least part of the processing units including an FPGA unit. During the processing of each processing unit, after a subtask of a previous piece of task data at a current substructure is completed and a subtask of a current piece of task data at a previous substructure is completed, a subtask of the current piece of task data at the current substructure starts to be performed. Processing units process the subtasks of the plurality of pieces of task data in parallel, so that the machine learning model may process a plurality of pieces of task data in parallel in a structure with low costs and low power consumption, thereby improving the efficiency of processing task data.

Figure 11:
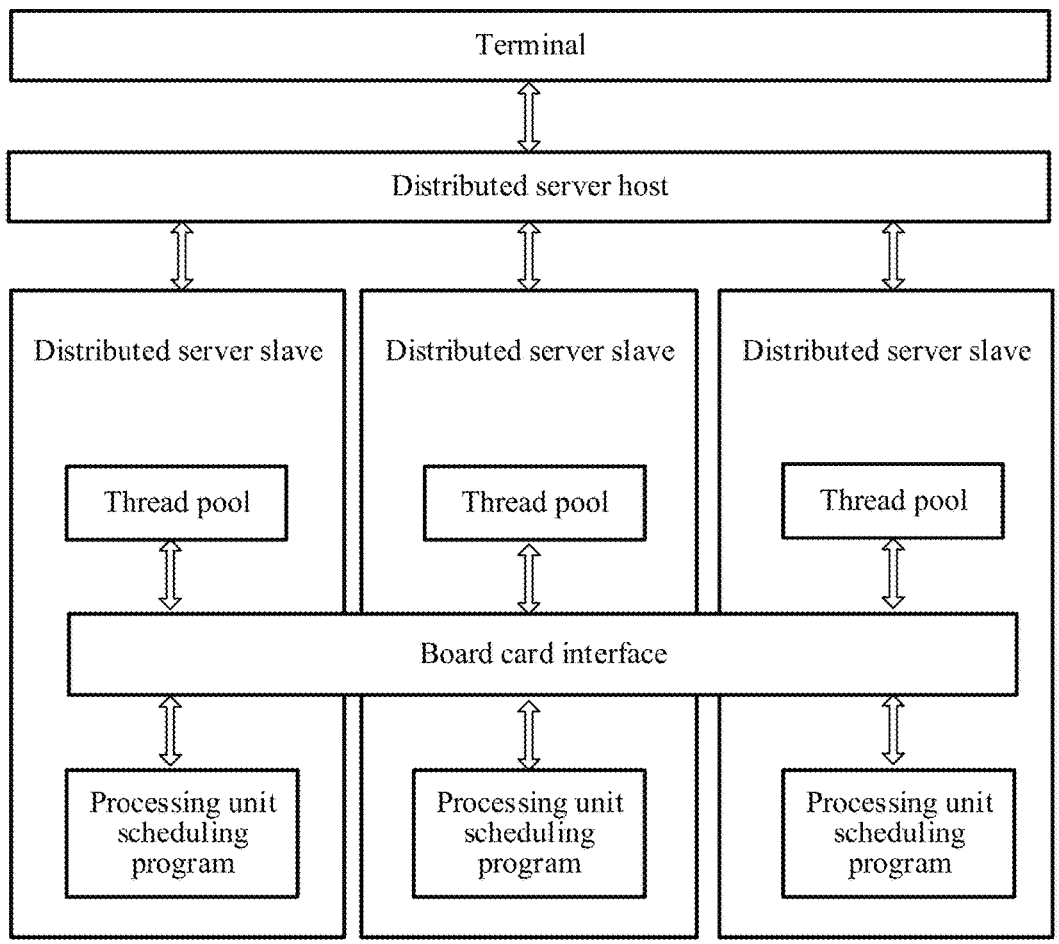
FIG. 11 is a diagram of an application environment of a task data processing method according to another embodiment of the present disclosure.

FIG. 11 is a diagram of an application environment of a task data processing method according to another embodiment. FIG. 11 includes a terminal, a distributed-server host, and a distributed-server slave. The terminal is connected to the distributed-server host by a network. The distributed-server host is connected to the distributed-server slave by a network. There may be one or more distributed-server slaves. The distributed-server slave is provided with a thread pool and a processing unit scheduling program. A board card interface of the distributed-server slave is connected to the task-data processing board card 130. The task-data processing board card 130 is provided with an FPGA unit. The distributed-server slave implements the task data processing method by executing the processing unit scheduling program. When executing the processing unit scheduling program, the distributed-server slave reads task data from a thread task of the thread pool, and performs the thread task according to the task data.

Figure 12:
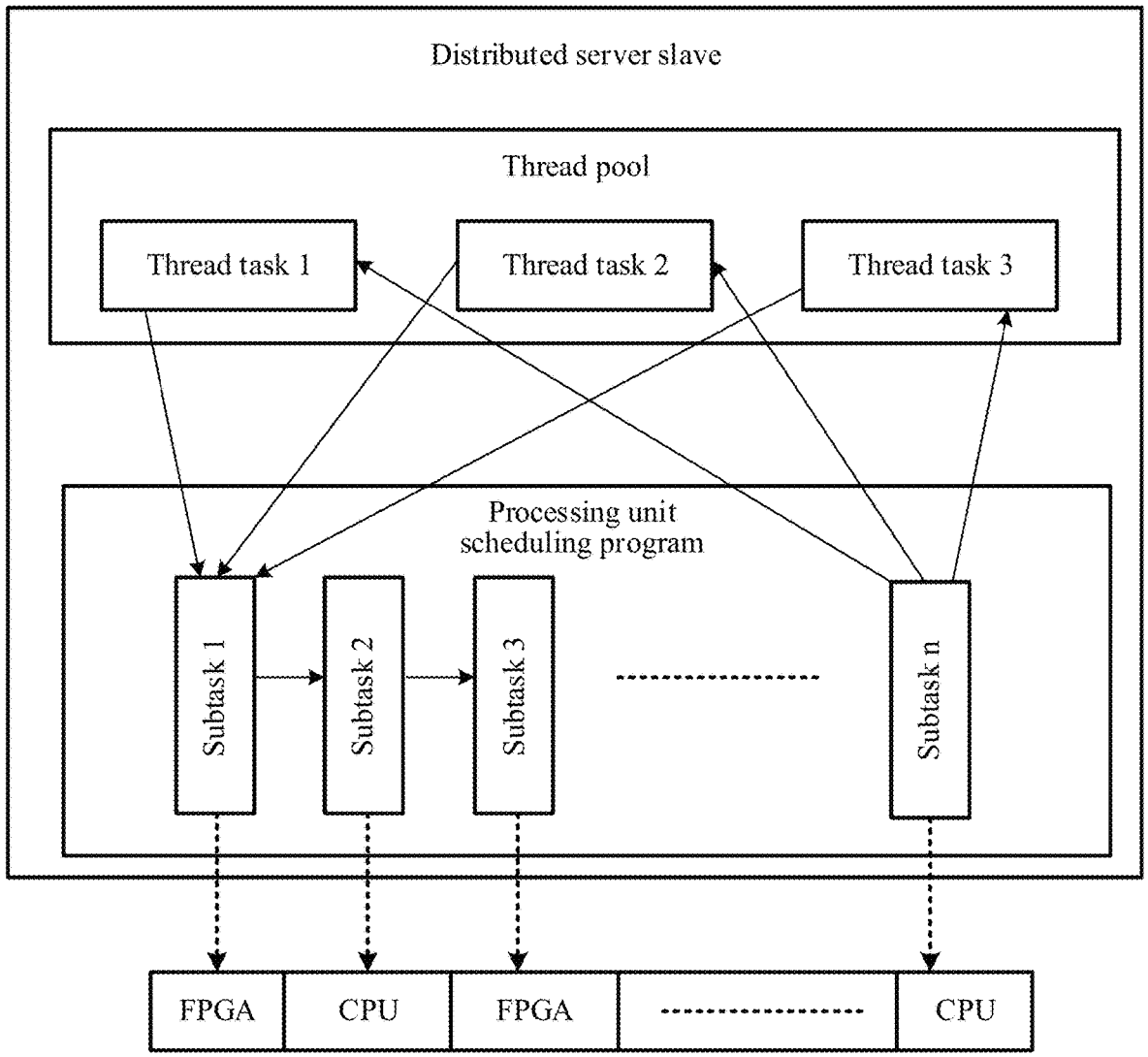
FIG. 12 is a diagram of an inner environment of a distributed server slave according to an embodiment of the present disclosure.

FIG. 12 is a diagram of an inner environment of a distributed-server slave according to an embodiment. The distributed-server slave is provided with a thread pool and a processing unit scheduling program. The distributed-server slave implements the task data processing method by executing the processing unit scheduling program, obtains task data from a thread task of the thread pool when executing the processing unit scheduling program, and schedules an FPGA unit and the CPU 110 to perform corresponding subtasks based on the task data in an order of subtasks in the processing unit scheduling program. The processing unit scheduling program may process a plurality of thread tasks in parallel, obtain task execution results of the plurality of thread tasks through processing of the processing unit scheduling program, and return the task execution results to corresponding thread tasks. The distributed-server slave then returns the task execution results to the distributed-server host. The processing unit scheduling program includes n subtasks, n being a positive integer.

Figure 13:
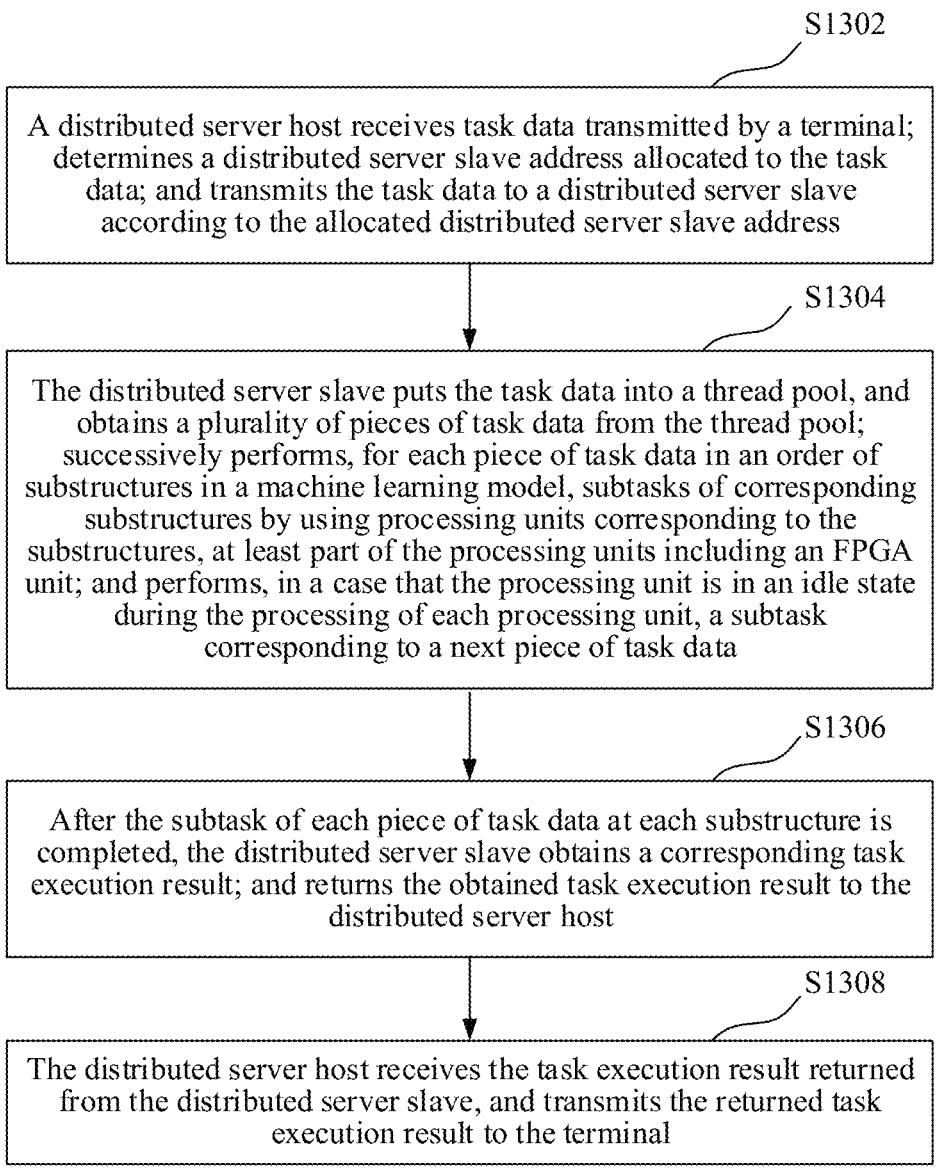
FIG. 13 is a schematic flowchart of a task data processing method according to an embodiment of the present disclosure.

As shown in FIG. 13, in an embodiment, a task data processing method applied to a distributed-server host is provided. The method includes the followings.

S1302. A distributed-server host receives task data transmitted by a terminal; determines a distributed-server slave address allocated to the task data; and transmits the task data to a distributed-server slave according to the allocated distributed-server slave address.

The task data may be image processing task data. In an embodiment, the distributed-server host may allocate distributed-server slaves to the task data according to a working state of each distributed-server slave. Correspondingly, the process for the distributed-server host to determine distributed-server slave addresses allocated to the task data may include: selecting, by the distributed-server host according to the working state of each distributed-server slave, a distributed-server slave that is in an idle state from the distributed-server slaves, and determining an address of the selected distributed-server slave.

In another embodiment, the distributed-server host may allocate the distributed-server slaves to the task data according to the type of the task data. Correspondingly, the process for the distributed-server host to determine distributed-server slave addresses allocated to the task data may include: selecting, by the distributed-server host according to the type of the task data, a distributed-server slave that is configured to process the type of the task data from the distributed-server slaves, and determining an address of the selected distributed-server slave.

S1304. The distributed-server slave puts the task data into a thread pool, and obtains a plurality of pieces of task data from the thread pool; successively performs, for each piece of task data in an order of substructures in a machine learning model, subtasks of corresponding substructures by using processing units corresponding to the substructures, at least part of the processing units including an FPGA unit; and performs, in a case that the processing unit is in an idle state during the processing of each processing unit, a subtask corresponding to a next piece of task data.

When the task data is the image processing task data, the machine learning model may be an image processing model. Correspondingly, for each piece of image processing task data in an order of substructures in the image processing model, image processing subtasks of the corresponding substructures are successively performed by using the processing units corresponding to the substructures.

When receiving the task data transmitted by the distributed-server host, the distributed-server slave puts the task data into the thread pool. When processing the task data, the distributed-server slave obtains a plurality of pieces of task data from the thread pool.

The distributed-server host may instruct the distributed-server slave to process the task data. Correspondingly, when the distributed-server slave receives an FPGA execution instruction transmitted by the distributed-server host, the distributed-server slave obtains the plurality of pieces of task data from the thread pool.

Further, the FPGA unit may perform the subtasks of the corresponding substructures. Correspondingly, the distributed-server slave successively performs, for each piece of task data in an order of substructures in the machine learning model, the subtasks of the corresponding substructures through FPGA units corresponding to the substructures; and performs, during the processing of the FPGA unit and in a case that the FPGA unit is in an idle state, a subtask corresponding to a next piece of task data.

When the processing unit is in a non-idle state and when the processing unit is released, the subtask corresponding to the next piece of task data is performed by using the processing unit. Alternatively, another processing unit is called to perform the subtask corresponding to the next piece of task data.

S1306. After the subtask of each piece of task data at each substructure is completed, the distributed-server slave obtains a corresponding task execution result; and returns the obtained task execution result to the distributed-server host.

When obtaining the corresponding task execution result, the FPGA unit stores the task execution result into a memory. The CPU 110 reads the task execution result from the memory, and returns the task execution result to the distributed-server host.

S1308. The distributed-server host receives the task execution result returned from the distributed-server slave, and transmits the returned task execution result to the terminal.

The task-data processing board card 130 obtains a plurality of pieces of image processing task data, and successively performs, for each piece of image processing task data in an order of substructures in the image processing model, an image processing subtask of a corresponding substructure by using processing units corresponding to the substructures; and starts to perform, during the processing of each processing unit, after an image processing subtask of a previous piece of image processing task data at a current substructure is completed and an image processing subtask of a current piece of image processing task data at a previous substructure is completed, an image processing subtask of the current piece of image processing task data at the current substructure. During the processing of each processing unit, the processing units process the image processing subtasks of the plurality of pieces of image processing task data in parallel, so that the plurality pieces of image processing task data may be processed in parallel by using the image processing model in a structure with low costs and low power consumption, thereby improving the efficiency of processing the image processing task data.

Figure 14:
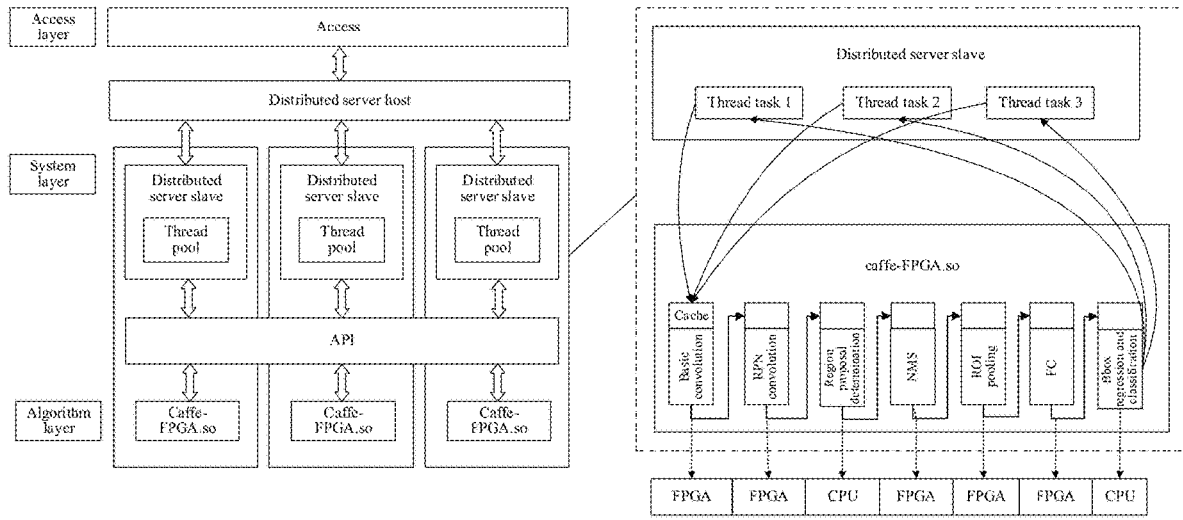
FIG. 14 is a diagram of a software architecture of a task data processing method according to an embodiment of the present disclosure.

As shown in FIG. 14, in another embodiment, the task data is the image processing task data, the machine learning model is the image processing model, and the task execution result is the image processing result. The image processing result may be an image recognition result, and the image recognition result may be text or the like recognized from the image. Referring to FIG. 14, an embodiment of the present disclosure provides an image data processing system. The image data processing system includes an access layer connected to a terminal, a distributed-server host, one or more distributed-server slaves located at a system layer, and an algorithm layer. The distributed-server slave is connected to the algorithm layer by an interface (for example, an application programming interface (API)). A thread pool is disposed in the distributed-server slave. The algorithm layer is provided with a machine learning model. The processing units include a CPU and an FPGA unit. The terminal accesses the distributed-server host through the access layer. The distributed-server host exchanges data with the distributed-server slaves at the system layer. The distributed-server slave calls an algorithm in a caffe-FPGA.so file at the algorithm layer through the API (a board card interface), and calls the FPGA unit and the CPU configuration to process the task data according to the algorithm in the caffe-FPGA.so file. The thread pool of the distributed-server slave includes a plurality of thread tasks. Each thread task calls the FPGA and the CPU to process the thread tasks in parallel according to the caffe-FPGA.so.

According to the embodiments of the present disclosure, a software architecture of an FPGA accelerator is detected based on an optical character recognition (OCR) scenario character of caffe, and caffe is transformed and added to a class that supports a call of the FPGA unit and a call of a plurality of FPGA units in parallel, so as to enable caffe to support a multi-thread concurrent mechanism. In addition, caffe is encapsulated into the caffe-FPGA.so file to support the algorithm by adding APIs, the caffe-FPGA.so is loaded in a distributed server architecture to schedule the FPGA unit, so as to ensure that the FPGA unit processes the thread tasks in parallel.

In one embodiment, the machine learning model includes a convolutional layer, a region proposal network (RPN), a pooling layer, a fully-connected layer, a first classification layer, and the like. Moreover, an output end of the convolutional layer is connected to an input end of the RPN, an output end of the RPN is connected to an input end of the pooling layer, an output end of the pooling layer is connected to an input end of the fully-connected layer, and an output end of the fully-connected layer is connected to an input end of the first classification layer. The first classification layer is configured to output the image processing result.

The RPN further includes an RPN convolutional layer, a second classification layer, a region proposal determination layer, and a non-maximum suppression (NMS) layer. Correspondingly, the output end of the convolutional layer is connected to an input end of the RPN convolutional layer, an output end of the RPN convolutional layer is connected to an input end of the second classification layer, an output end of the second classification layer is connected to an input end of the region proposal determination layer, an output end of the region proposal determination layer is connected to an input end of the NMS layer, and an output end of the NMS layer is connected to the input end of the pooling layer.

In addition to parts of the region proposal determination layer in the RPN and a last recognition result output are processed by using the CPU 110, all other parts in the machine learning model are implemented based on the FPGA unit, so as to process a part of relatively large data processing capacity in parallel by using the FPGA unit, and still process a part of relatively small data processing capacity by using the CPU 110, thereby improving the data processing efficiency and reducing the cost.

Figure 15:
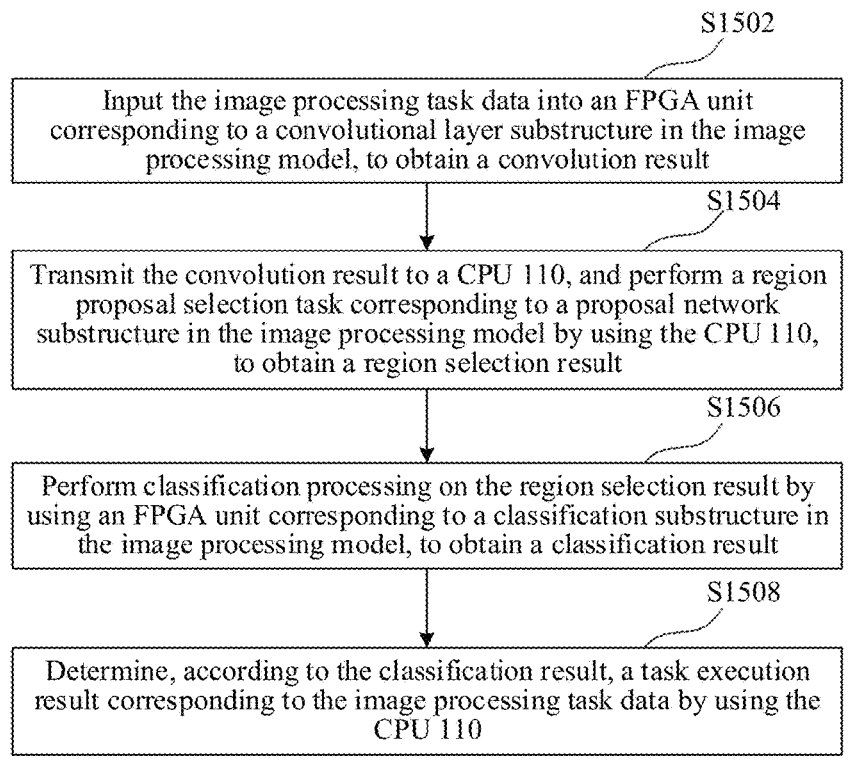
FIG. 15 is a schematic flowchart of steps of substructures processing image processing task data according to an embodiment of the present disclosure.

As shown in FIG. 15, in an embodiment, the successively performing, for each piece of image processing task data in an order of substructures in the image processing model, image processing subtasks of the corresponding substructures by using the processing units corresponding to the substructures includes the process for the substructures to process the image processing task data. The process specifically includes the followings.

S1502. Input the image processing task data into an FPGA unit corresponding to a convolutional layer substructure in the image processing model, to obtain a convolution result.

The image processing model is a pre-trained data model that processes the image processing task data according to image data. The image processing model includes the convolutional layer substructure. In an order of substructures in the image processing model, the convolutional layer substructure may be a first substructure in the image processing model. A processing unit corresponding to the convolutional layer substructure is the FPGA unit.

The task-data processing board card 130 reads processing unit call data from a register, extracts a processing unit identifier in the processing unit call data, determines an FPGA unit corresponding to the convolutional layer substructure in the image processing model according to the processing unit identifier, and transmits a task execution notification to the FPGA unit corresponding to the convolutional layer substructure. When receiving the task execution notification, the FPGA unit corresponding to the convolutional layer substructure reads image processing task data from a memory, and performs convolution processing corresponding to the convolutional layer substructure on the image processing task data, to obtain a convolution result of the image processing task data.

In an embodiment, the FPGA unit corresponding to the convolutional layer substructure reads a model parameter of the image processing model from the memory, and performs configuration according to the read model parameter, to enable the FPGA unit corresponding to the convolutional layer substructure to perform convolution processing on the image processing task data according to the model parameter, to obtain a convolution result of the image processing task data.

In an embodiment, when obtaining the convolution result of the image processing task data, the FPGA unit corresponding to the convolutional layer substructure stores the convolution result in the memory.

During the initialization work, the CPU 110 writes the model parameter in the memory in a peripheral component interconnect express (PCIE) DMA write operation manner.

S1504. Transmit the convolution result to the CPU 110, and perform a region proposal selection task corresponding to a proposal network substructure in the image processing model by using the CPU 110, to obtain a region selection result.

The image processing model includes the convolutional layer substructure. In an order of substructures in the image processing model, the proposal network substructure may be a second substructure in the image processing model. A processing unit corresponding to the proposal network substructure is a CPU. A subtask corresponding to the proposal network substructure is a region proposal selection task. The region proposal selection task is used for selecting a to-be-processed region proposal in an image corresponding to the image processing task data.

When the image processing model is configured to recognize text in an image, in this step, the to-be-processed region proposal may be an area including text.

After detecting that the FPGA unit corresponding to the convolutional layer substructure stores the convolution result in the memory, the task-data processing board card 130 transmits a region proposal selection task execution notification to the CPU 110. After receiving the region proposal selection task execution notification, the CPU 110 reads the convolution result from the memory, performs a region proposal selection task corresponding to the proposal network substructure according to the convolution result, to obtain a region selection result, and stores the region selection result in the memory.

In an embodiment, the CPU 110 reads the model parameter of the image processing model from the memory, configures the proposal network substructure according to the model parameter, and performs the region proposal selection task according to the convolution result by using the configured proposal network substructure, to obtain the region selection result.

S1506. Perform classification processing on the region selection result by using an FPGA unit corresponding to a classification substructure in the image processing model, to obtain a classification result.

The image processing model includes the classification substructure. In an order of substructures in the image processing model, the classification substructure may be a third substructure in the image processing model.

After detecting that the CPU 110 stores the region selection result in the memory, the task-data processing board card 130 transmits a task execution notification to an FPGA unit corresponding to the classification substructure. When receiving the task execution notification, the FPGA unit corresponding to the classification substructure reads a region selection result from the memory, performs classification processing on the read region selection result, to obtain a classification result, and stores the classification result in the memory.

In an embodiment, the FPGA unit corresponding to the classification substructure reads the model parameter of the image processing model from the memory, configures the classification substructure according to the model parameter, and performs classification processing on the region selection result by using the classification substructure, to obtain the classification result.

S1508. Determine, according to the classification result, a task execution result corresponding to the image processing task data by using the CPU 110.

When detecting that the FPGA unit corresponding to the classification substructure stores the classification result in the memory, the task-data processing board card 130 transmits a task result determination notification to the CPU 110. When receiving the task result determination notification, the CPU 110 reads the classification result from the memory, and selects a task execution result corresponding to the image processing task data according to the classification result. For example, the task execution result corresponding to the image processing task data may be the image recognition result.

Figure 16:
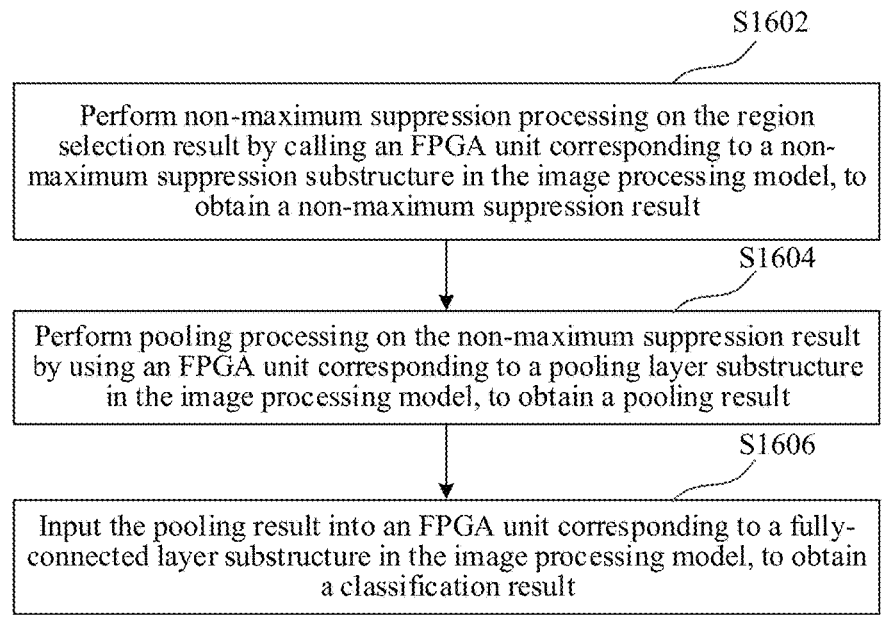
FIG. 16 is a schematic flowchart of steps of obtaining a classification result according to an embodiment of the present disclosure.

As shown in FIG. 16, in an embodiment, S1506 specifically further includes obtaining the classification result, and the obtaining process specifically includes the followings.

S1602. Perform non-maximum suppression processing on the region selection result by calling an FPGA unit corresponding to a non-maximum suppression substructure in the image processing model, to obtain a non-maximum suppression result.

The image processing model further includes the non-maximum suppression substructure. A processing unit corresponding to the non-maximum suppression substructure is the FPGA unit. A subtask corresponding to the non-maximum suppression substructure is a non-maximum suppression processing task, and a non-maximum suppression result is a processing result corresponding to the non-maximum suppression processing task.

When detecting that the CPU 110 stores the region selection result in the memory, the task-data processing board card 130 transmits a task execution notification to the FPGA unit corresponding to the non-maximum suppression substructure. When receiving the task execution notification, the FPGA unit corresponding to the non-maximum suppression substructure reads the region selection result from the memory, performs non-maximum suppression processing on the read region selection result, to obtain a non-maximum suppression result, and stores the non-maximum suppression result in the memory.

In an embodiment, the FPGA unit corresponding to the non-maximum suppression substructure reads the model parameter of the image processing model from the memory, configures the non-maximum suppression substructure according to the model parameter, and performs non-maximum suppression processing on the region selection result by using the non-maximum suppression substructure, to obtain the non-maximum suppression result.

S1604. Perform pooling processing on the non-maximum suppression result by using an FPGA unit corresponding to a pooling layer substructure in the image processing model, to obtain a pooling result.

The image processing model further includes the pooling layer substructure, and a processing unit corresponding to the pooling layer substructure is the FPGA unit. A subtask corresponding to the pooling layer substructure is a pooling layer subtask, and a processing result corresponding to the pooling layer subtask is the pooling result.

When detecting that the FPGA unit corresponding to the non-maximum suppression substructure stores the non-maximum suppression result in the memory, the task-data processing board card 130 transmits a task execution notification to the FPGA unit corresponding to the pooling layer substructure. When receiving the task execution notification, the FPGA unit corresponding to the pooling layer substructure reads the non-maximum suppression result from the memory, performs the pooling layer subtask according to the non-maximum suppression result, that is, performs pooling processing on the non-maximum suppression result, to obtain the pooling result, and stores the pooling result in the memory.

In an embodiment, the FPGA unit corresponding to the pooling layer substructure reads the model parameter of the image processing model from the memory, configures the pooling layer substructure according to the model parameter, and performs pooling processing on the non-maximum suppression result by using the pooling layer substructure, to obtain the pooling result.

S1606. Input the pooling result into an FPGA unit corresponding to a fully-connected layer substructure in the image processing model, to obtain a classification result.

The image processing model further includes the fully-connected layer substructure, and a processing unit corresponding to the fully-connected layer substructure is the FPGA unit. A subtask corresponding to the fully-connected layer substructure is a fully-connected processing task, and a processing result corresponding to the fully-connected processing task is the classification result.

When detecting that the FPGA unit corresponding to the pooling layer substructure stores the pooling result in the memory, the task-data processing board card 130 transmits a task execution notification to the FPGA unit corresponding to the fully-connected layer substructure. When receiving the task execution notification, the FPGA unit corresponding to the fully-connected layer substructure reads a pooling result from the memory, performs the fully-connected processing task according to the pooling result, to obtain the classification result, and stores the classification result in the memory.

In an embodiment, the FPGA unit corresponding to the fully-connected layer substructure reads the model parameter of the image processing model from the memory, configures the fully-connected layer substructure according to the read model parameter, and performs fully-connected processing on the pooling result by using the fully-connected layer substructure, to obtain the classification result.

In an embodiment, the image processing result may be an image recognition result. The image recognition result may be an OCR result or may be an image target recognition result.

Figure 17:
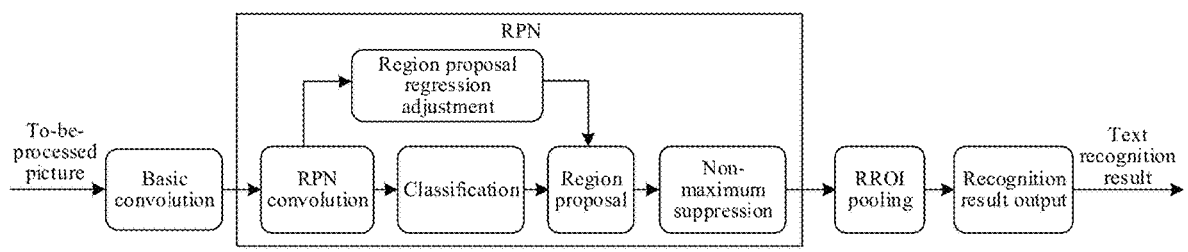
FIG. 17 is a schematic flowchart of steps of obtaining an image processing result according to an embodiment of the present disclosure.

Referring to FIG. 17, when a text recognition, for example, an OCR, needs to be performed, the distributed-server slave obtains a to-be-processed picture, and encapsulates the to-be-processed picture as a thread task. The thread task calls an FPGA unit corresponding to a basic convolutional layer to perform convolution processing on the to-be-processed picture, to obtain a text feature. When obtaining the text feature, the thread task inputs the text feature into the RPN. In the RPN, the thread task calls an FPGA unit corresponding to the RPN convolution to perform RPN convolution processing on the text feature, to obtain a convolution result corresponding to the text feature. The thread task calls the FPGA unit corresponding to the class to perform classification processing on the convolution result corresponding to the text feature to obtain the classification result. The thread task calls the CPU 110 to determine the text box proposal according to the classification result, calls the CPU 110 to perform a regression adjustment on the determined text box proposal, to obtain text box proposals at different angles, and calls the FPGA unit corresponding to the non-maximum suppression to process the overlapping text box proposals in the text box proposals, to obtain text box proposals at any angles that do not overlap. The thread task calls an FPGA unit corresponding to the rotation region of interest (RROI) pooling to perform pooling processing on text box proposals at different angles outputted by the RPN, performs rotation adjustment on the text box proposals at different angles, and projects the text box proposals after the rotation adjustment onto a feature graph of a fixed size, to obtain a text box feature graph corresponding to the text box proposal. The thread task calls an FPGA unit corresponding to a recognition result output to recognize text in the text box feature graph, to output a text recognition result.

In one embodiment, in addition to the parts of the region proposal determination layer in the RPN and the last recognition result output, all other parts are implemented based on the FPGA. Therefore, a part of relatively large data processing capacity can be implemented by the FPGA in parallel with relatively low costs, and a part of relatively small data processing capacity is processed by the CPU, so as to reduce the costs while the processing efficiency is kept.

Different processing units have different levels of input output parallelism. The FPGA unit corresponding to the convolutional layer adopts a level of parallelism with 32 inputs and 32 outputs. The FPGA corresponding to the class adopts a level of parallelism with 16 inputs and 64 outputs. The FPGA unit corresponding to the RPN convolution adopts a level of parallelism with 8 inputs and 8 outputs. Therefore, the processing efficiency is improved.

Figure 18:
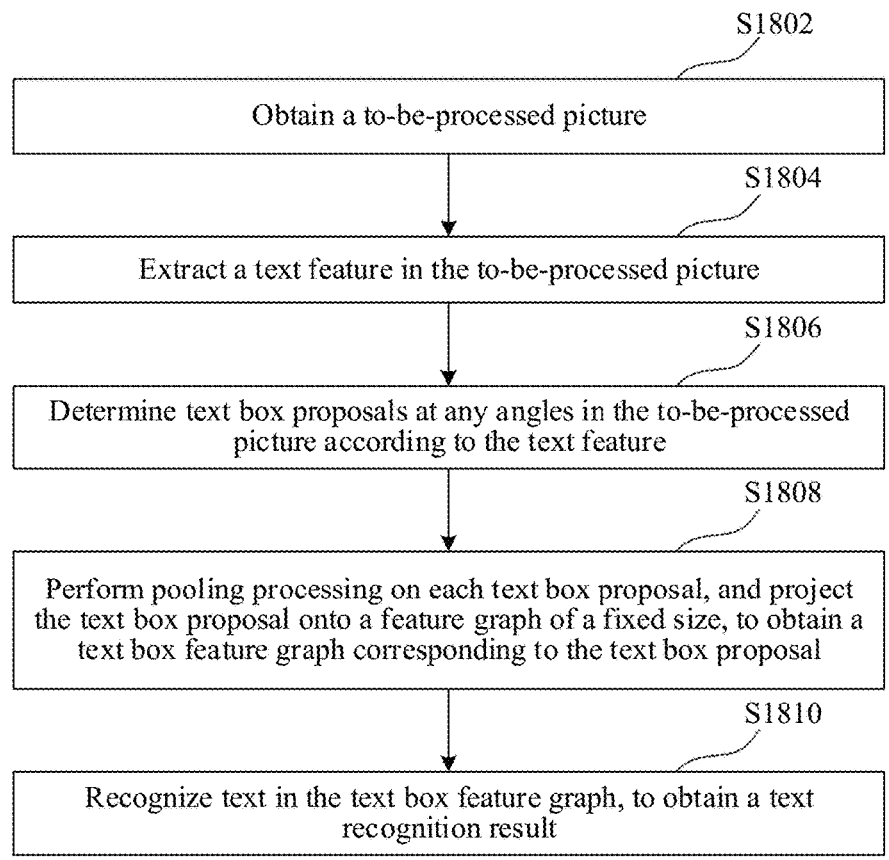
FIG. 18 is a schematic flowchart of a picture processing method according to an embodiment of the present disclosure.

As shown in FIG. 18, in an embodiment, a picture processing method is provided to implement the foregoing OCR. The method specifically includes the followings.

S1802. Obtain a to-be-processed picture.

The to-be-processed picture is a picture to be processed for text recognition. The text recognition may be recognizing the text in the picture by using the OCR technology. When the to-be-processed picture needs to be recognized, the terminal transmits a text recognition request to the CPU 110. The CPU 110 receives the text recognition request, and obtains the to-be-processed picture according to the text recognition request.

In an embodiment, the text recognition request carries the to-be-processed picture. Correspondingly, a step that the CPU 110 obtains the to-be-processed picture according to the text recognition request may be that: obtaining, by the CPU 110, the to-be-processed picture from the text recognition request.

In another embodiment, the text recognition request carries a picture identifier of the to-be-processed picture. Correspondingly, a step that the text recognition request carries the to-be-processed picture may be that: parsing, by the CPU 110, the text recognition request, extracting the picture identifier in the text recognition request through parsing, and reading the to-be-processed picture from the memory according to the picture identifier. The picture identifier may be a storage address of the picture in the memory.

The size of the to-be-processed picture may be any size. Therefore, the picture processing method in the present disclosure can support to-be-processed pictures of different sizes, the pictures of different sizes can be configured adaptively, and the size of the largest to-be-processed picture supported in the method is 1024*1024.

S1804. Extract a text feature in the to-be-processed picture.

The text feature is a feature representing text in the to-be-processed picture. When obtaining the to-be-processed picture, the CPU 110 performs convolution processing on the to-be-processed picture, and extracts the text feature in the to-be-processed picture through the convolution processing.

In an embodiment, the step of S1804 includes the following content: inputting, by the CPU 110, the to-be-processed picture into the convolutional layer; and performing convolution processing on the to-be-processed picture according to a convolution kernel of the convolutional layer, to obtain the text feature in the to-be-processed picture.

The CPU 110 inputs the to-be-processed picture into the convolutional layer of a machine learning model, performs convolution processing on the to-be-processed picture by using the convolution kernel of the convolutional layer, and obtains the text feature in the to-be-processed picture through convolution processing. The machine learning model may be a picture processing model that is configured to perform text recognition processing on the to-be-processed picture.

S1806. Determine text box proposals at any angles in the to-be-processed picture according to the text feature.

The text box proposal may be a region box including text in the to-be-processed picture. When extracting the text feature in the to-be-processed picture, the CPU 110 determines a text box proposal including the text in the to-be-processed picture according to the text feature. The text box proposal may be a text box proposal at any angle. The text box proposal at any angle may be a text box proposal at any one of a horizontal angle, a vertical angle, an inclined angle or the like.

In an embodiment, when extracting the text features from the to-be-processed picture, the CPU 110 inputs the text feature into the RPN of the machine learning model, and determines the text box proposals at any angles in the to-be-processed picture by using the RPN according to the text feature. The RPN may be a rotation RPN (RRPN).

In the embodiments of the present disclosure, the RRPN algorithm can improve the accuracy. Because the RRPN algorithm has a complex process and a running speed at the end of the CPU 110 is relatively slow, in one embodiment of the present disclosure, an accelerator architecture covers the most time-consuming part of the algorithm, thereby greatly improving the overall running efficiency. Compared with a software version of the CPU 110, the running efficiency is increased to more than 10 times high, the throughput is 1.4 times that of the GPU, and the costs are reduced to 30%.

S1808. Perform pooling processing on each text box proposal, and project the text box proposal onto a feature graph of a fixed size, to obtain a text box feature graph corresponding to the text box proposal.

The CPU 110 performs pooling processing on the text box proposals at any angles, and projects the text box proposals at any angles onto the feature graph of a fixed size through pooling processing, to obtain a text box feature graph whose size is the same as that of each text box proposal.

In an embodiment, the CPU 110 inputs the text box proposals at any angles into the pooling layer of the machine learning model, and projects the text box proposals onto the feature graph of a fixed size through pooling layer, to obtain the text box feature graphs of the same size as the text box proposals. The pooling layer may be an RROI pooling layer.

In an embodiment, S1808 further includes: inputting each text box proposal into the pooling layer; determining a projection parameter of the text box proposal according to a fixed size of a preset feature graph; and projecting the text box proposal onto the feature graph of the fixed size according to the projection parameter, to obtain the text box feature graph corresponding to the text box proposal.

S1810. Recognize text in the text box feature graph,to obtain a text recognition result.

The CPU 110 recognizes text in each text box feature graph, and obtains a text recognition result corresponding to the text box feature graph through recognition.

In an embodiment, the CPU 110 inputs each text box feature graph into an output layer of the machine learning model, and performs OCR on the text box feature graph through the output layer, to obtain the text recognition result corresponding to the text box feature graph.

In one embodiment, text box proposals at any angles in a to-be-processed picture are determined according to a text feature in the to-be-processed picture, so that text box proposals at different angles can be recognized. Pooling processing is performed on each text box proposal, and text box proposals are projected onto a feature graph of a fixed size, to obtain a text box feature graph of each text box proposal, thereby improving the adaptability of processing a text box proposal. Text box proposals of different sizes and at different angles may be processed, and a text recognition result of each text box proposal can be obtained by recognizing text in a text box feature graph, thereby improving the accuracy and efficiency of text recognition in the to-be-processed picture.

In an embodiment, the picture processing method further includes the following content: inputting the to-be-processed picture into the machine learning model by using at least one thread, and successively performing, in an order of substructures in the machine learning model, the subtasks of the corresponding substructures by using the processing units corresponding to the substructures, the at least part of the processing units including the FPGA unit.

When performing each subtask, one of the following steps is performed: extracting a text feature in the to-be-processed picture; determining text box proposals at any angles in the to-be-processed picture according to the text feature; performing pooling processing on each text box proposal, and projecting the text box proposal onto a feature graph of a fixed size, to obtain a text box feature graph corresponding to the text box proposal; and recognizing text in the text box feature graphs to obtain a text recognition result.

In one embodiment, the processing units implement the subtasks of the picture processing method, so that the subtasks of a plurality of to-be-processed pictures may be processed in parallel, and some subtasks are implemented by using the FPGA unit in the processing units, thereby improving the efficiency of text recognition in the to-be-processed picture.

In an embodiment, S1806 specifically includes the following content: inputting the text feature into the RPN; performing convolution processing on the text feature through a region proposal convolutional layer in the RPN, to obtain a text feature convolution result; determining location information of each text box proposal in the to-be-processed picture according to the text feature convolution results; and performing non-maximum suppression processing on the location information of the text box proposals, to obtain the text box proposals at any angles.

The CPU 110 inputs the text feature into the RPN; performs convolution processing on the text feature through a region proposal convolutional layer in the RPN, to obtain a text feature convolution result through convolution processing; and determines the text box proposals in the to-be-processed picture according to the text feature convolution result, and obtains location information of the determined text box proposals. The CPU 110 performs non-maximum suppression processing on the location information of the text box proposals, to obtain the text box proposals at any angles.

In an embodiment, the performing non-maximum suppression processing on the location information of the text box proposals to obtain the text box proposals at any angles includes: determining text box proposals at any angles in the to-be-processed picture according to the location information of the text box proposals; determining overlapping text box proposals; and performing non-maximum suppression processing on the overlapping text box proposals to obtain text box proposals at any angles that do not overlap.

The CPU 110 determines text box proposals at any angles in the to-be-processed picture according to the location information of the text box proposals, selects overlapping text box proposals from the text box proposals, and performs non-maximum suppression processing on the overlapping text box proposals to obtain text box proposals at any angles that do not overlap.

In one embodiment, the text box proposals at any angles in the to-be-processed picture may be determined by using the RPN, the text box proposals at any angles that do not overlap are obtained by performing non-maximum suppression processing on the text box proposals at any angles, thereby improving the accuracy of determining the text box proposal.

In an embodiment, the machine learning model includes a fully-connected layer connected to the pooling layer. S1610 specifically includes the following content: inputting the text box feature graph into the fully-connected layer; determining a probability value corresponding to each text class through the text box feature graph; and selecting a text class corresponding to the largest probability value as the text recognition result of the text box feature graph.

After obtaining the text box feature graph corresponding to each text box proposal, the CPU 110 inputs the text box feature graph into the fully-connected layer of the machine learning model, processes the text box feature graph by using the fully-connected layer to obtain a probability value corresponding to each text class corresponding to the text box feature graph, determines the largest probability value in the probability values, and selects a text class corresponding to the largest probability value as the text recognition result of the text box feature graph.

In an embodiment, the plurality of processing units include the FPGA unit and the CPU. There are a plurality of to-be-processed pictures. The current to-be-processed pictures are inputted into an FPGA unit corresponding to the convolutional layer for processing, to obtain a text feature in the to-be-processed picture. The text features are inputted into the CPU corresponding to the RPN for processing, to determine text box proposals at any angles. Text box feature graphs corresponding to the text box proposals are determined according to the text box proposals at any angles by using an FPGA unit corresponding to the pooling layer; and text in the text box feature graphs is recognized according to an FPGA unit corresponding to a recognition result layer, to obtain the text recognition result. When the processing unit is in an idle state during the processing of each processing unit, a subtask corresponding to a next to-be-processed picture is performed in parallel.

In one embodiment, some FPGA units and CPUs perform subtasks corresponding to substructures in a machine learning model, and when a plurality of to-be-processed pictures are obtained, the FPGA units and CPUs perform subtasks corresponding to the to-be-processed pictures in parallel, so that the subtasks corresponding to the to-be-processed pictures may be processed in parallel, thereby improving the efficiency of processing a plurality of to-be-processed pictures.

Figure 19:
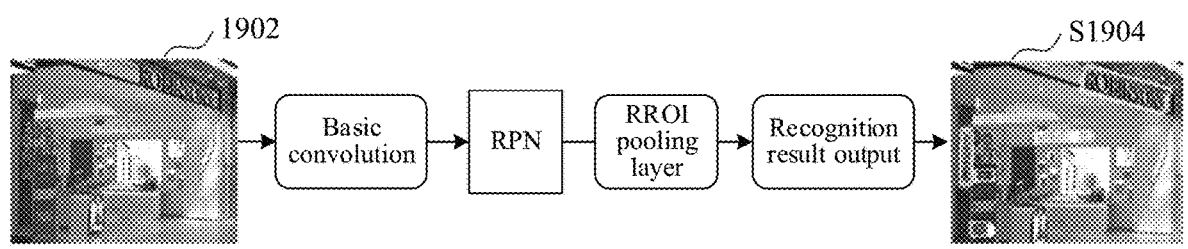
FIG. 19 is a schematic flowchart of text recognition according to an embodiment of the present disclosure.

FIG. 19 is a schematic flowchart of text recognition according to an embodiment. A text feature in a to-be-processed picture 1902 is obtained by performing basic convolution processing on a to-be-processed picture 1802. Text box proposals at any angles in the to-be-processed picture 1902 are obtained by processing the text feature in the to-be-processed picture 1902 by using the RPN. A text box feature graph of a fixed size corresponding to each text box proposal is obtained by adjusting the text box proposals at any angles through the RROI pooling layer, and a text recognition result 1904 is outputted by recognizing the text box feature graphs through a recognition result output. Recognized text is shown in a white box in the text recognition result 1904.

Figure 20:
FIG. 20 is a schematic diagram of a text recognition result corresponding to an application scenario of the present disclosure.
Figure 21:
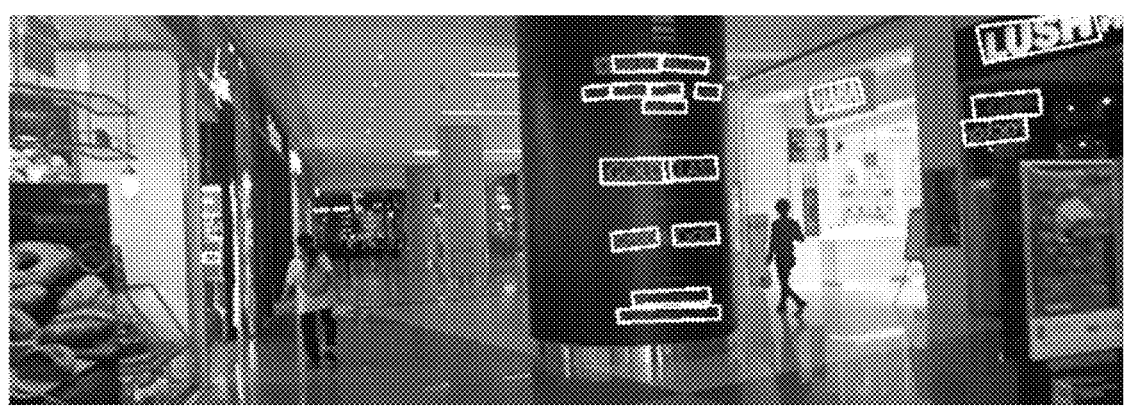
FIG. 21 is a schematic diagram of a text recognition result corresponding to another application scenario.
Figure 22:
FIG. 22 is a schematic diagram of a text recognition result corresponding to another application scenario.
Figure 23:
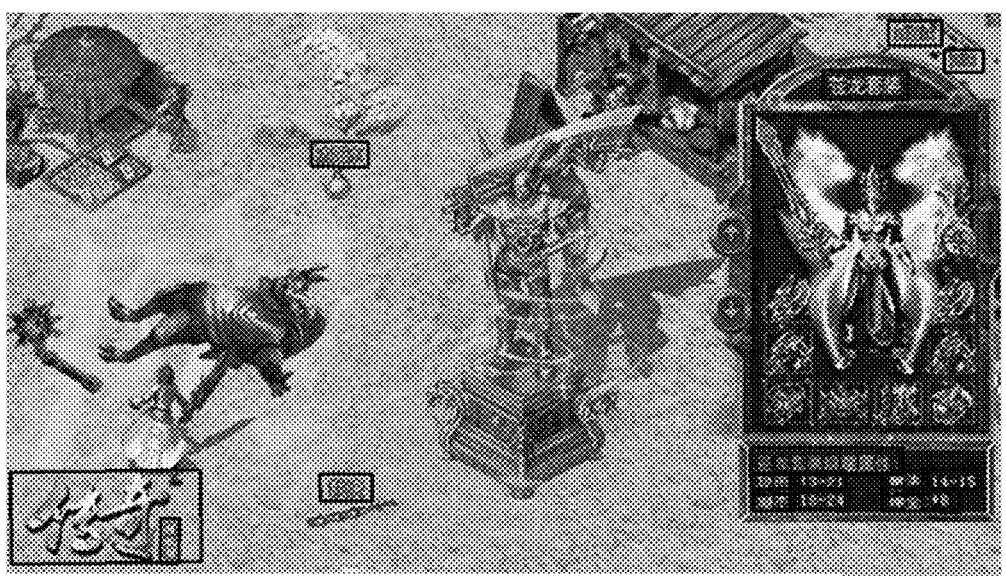
FIG. 23 is a schematic diagram of a text recognition result corresponding to another application scenario.
Figure 24:
FIG. 24 is a schematic diagram of a text recognition result corresponding to another application scenario.

FIG. 20 to FIG. 24 are schematic diagrams of text recognition results corresponding to application scenarios. FIG. 20 shows a text recognition result obtained by recognizing text in an advertisement picture and recognized text is shown in a black box. FIG. 21 shows a text recognition result obtained by recognizing text in a natural scene picture and recognized text is shown in a white box. FIG. 22 and FIG. 23 show text recognition results obtained by recognizing text in game pictures, and recognized text is shown in a black box. FIG. 24 shows a text recognition result obtained by recognizing text in a bank card picture and recognized text is numbers in a black box.

In one embodiment, some FPGA units perform subtasks corresponding to substructures in a machine learning model, and when a plurality of pieces of task data are obtained, the FPGA units perform subtasks corresponding to the pieces of task data in parallel, so that the subtasks corresponding to the pieces of task data may be processed in parallel, thereby improving the efficiency of processing a plurality of pieces of task data.

It may be understood that all or some of the procedures of the methods in the foregoing embodiments may be implemented by a computer program instructing relevant hardware. The computer program may be stored in a non-transitory computer-readable storage medium. When the program is executed, the procedures of the foregoing method embodiments may be performed. Any reference to a memory, storage, database, or another medium used in the embodiments provided in the present disclosure may include a non-transitory and/or volatile memory. The non-transitory memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAIVI), an enhanced SDRAM (ESDRAM). Synchronous link (Synchlink) DRAM (SLDRAIVI), a rambus direct RAM (RDRAM), a direct rambus dynamic RAM (DRDRAM), and a rambus dynamic RAM (DRAM).

The technical features in the foregoing embodiments may be randomly combined. For concise description, not all possible combinations of the technical features in the embodiment are described. However, the combinations of the technical features are all to be considered as falling within the scope described in this specification provided that they do not conflict with each other.

The foregoing embodiments only show several implementations of the present disclosure and are described in detail, but they are not to be construed as a limit to the scope of the present disclosure. A person of ordinary skill in the art may further make variations and improvements without departing from the ideas of the present disclosure, which shall fall within the protection scope of the present disclosure. Therefore, the protection scope of the present disclosure shall be subject to the protection scope of the appended claims.

What is claimed is:

1. A task data processing method for a computer device, comprising:
obtaining a plurality of pieces of task data;
reading, for each piece of task data, processing unit call data from a register, the processing unit call data being written into the register by a central processing unit (CPU);
successively calling, based on the processing unit call data in an order of substructures in a machine learning model, processing units corresponding to the substructures to perform subtasks of the corresponding substructures; and
performing, in a case that the processing unit is in an idle state during the processing of each processing unit, a subtask corresponding to a next piece of task data in parallel.

2. The method according to claim 1, wherein:
the task data is image processing task data, the machine learning model is an image processing model, and a task execution result is an image processing result; and
the successively performing, for each piece of task data in an order of substructures in a machine learning model, subtasks of corresponding substructures by using processing units corresponding to the substructures comprises:
successively performing, for each piece of image processing task data in an order of substructures in the image processing model, image processing subtasks of the corresponding substructures by using the processing units corresponding to the substructures.

3. The method according to claim 2, wherein:
the processing units further comprise a central processing unit (CPU), and
the successively performing, for each piece of image processing task data in an order of substructures in the image processing model, image processing subtasks of the corresponding substructures by using the processing units corresponding to the substructures comprises:
inputting the image processing task data into an FPGA unit corresponding to a convolutional layer substructure in the image processing model, to obtain a convolution result;
transmitting the convolution result to the CPU, and performing a region proposal selection task corresponding to a proposal network substructure in the image processing model by using the CPU, to obtain a region selection result;
performing classification processing on the region selection result by using an FPGA unit corresponding to a classification substructure in the image processing model, to obtain a classification result; and
determining, according to the classification result, a task execution result corresponding to the image processing task data by using the CPU.

4. The method according to claim 3, wherein the performing classification processing on the region selection result by using an FPGA unit corresponding to a classification substructure in the image processing model, to obtain a classification result comprises:

performing non-maximum suppression processing on the region selection result by calling an FPGA unit corresponding to a non-maximum suppression substructure in the image processing model, to obtain a non-maximum suppression result;

performing pooling processing on the non-maximum suppression result by using an FPGA unit corresponding to a pooling layer substructure in the image processing model, to obtain a pooling result; and inputting the pooling result into an FPGA unit corresponding to a fully-connected layer substructure in the image processing model, to obtain the classification result.

5. The method according to claim 1, further comprising:
waiting for, in a case that a subtask of a previous piece of task data at a current substructure is not completed and a subtask of a current piece of task data at a previous substructure is completed during the processing of each processing unit, a processing unit corresponding to a subtask of the current substructure to be released; and calling, in a case that the processing unit corresponding to the subtask of the current substructure is released, the processing unit corresponding to the subtask of the current substructure to perform a subtask of the current piece of task data at the current substructure.

6. A task-data processing apparatus, comprising:
at least a task scheduling unit and a field-programmable gate array (FPGA) unit that are connected to each other, the task scheduling unit being configured to:
obtain a plurality of pieces of task data;
read, for each piece of task data, processing unit call data from a register, the processing unit call data being written into the register by a central processing unit (CPU);
successively call, based on the processing unit call data in the order of the substructures in the machine learning model, the processing units corresponding to the substructures to perform the subtasks of the corresponding substructures; and
perform, in a case that the processing unit is in an idle state during the processing of each processing unit, a subtask corresponding to a next piece of task data in parallel.

7. The task-data processing apparatus according to claim 6, wherein:
the task data is image processing task data, the machine learning model is an image processing model, and a task execution result is an image processing result; and
the successively performing, for each piece of task data in an order of substructures in a machine learning model, subtasks of corresponding substructures by using processing units corresponding to the substructures comprises:
successively performing, for each piece of image processing task data in an order of substructures in the image processing model, image processing subtasks of the corresponding substructures by using the processing units corresponding to the substructures.

8. The task-data processing apparatus according to claim 7, wherein:
the processing units further comprise a central processing unit (CPU), and the successively performing, for each piece of image processing task data in an order of substructures in the image processing model, image processing subtasks of the corresponding substructures by using the processing units corresponding to the substructures comprises:
inputting the image processing task data into an FPGA unit corresponding to a convolutional layer substructure in the image processing model, to obtain a convolution result;
transmitting the convolution result to the CPU, and performing a region proposal selection task corresponding to a proposal network substructure in the image processing model by using the CPU, to obtain a region selection result;
performing classification processing on the region selection result by using an FPGA unit corresponding to a classification substructure in the image processing model, to obtain a classification result; and
determining, according to the classification result, a task execution result corresponding to the image processing task data by using the CPU.

9. The task-data processing apparatus according to claim 8, wherein the performing classification processing on the region selection result by using an FPGA unit corresponding to a classification substructure in the image processing model, to obtain a classification result comprises:
performing non-maximum suppression processing on the region selection result by calling an FPGA unit corresponding to a non-maximum suppression substructure in the image processing model, to obtain a non-maximum suppression result;
performing pooling processing on the non-maximum suppression result by using an FPGA unit corresponding to a pooling layer substructure in the image processing model, to obtain a pooling result; and
inputting the pooling result into an FPGA unit corresponding to a fully-connected layer substructure in the image processing model, to obtain the classification result.

10. The task-data processing apparatus according to claim 9, wherein:
the FPGA unit corresponding to the pooling layer substructure reads a model parameter of the image processing model from a memory, configures the pooling layer substructure according to the model parameter, and performs the pooling processing on the non-maximum suppression result by using the pooling layer substructure, to obtain the pooling result.

11. The task-data processing apparatus according to claim 6, wherein the task scheduling unit is further configured to perform:
waiting for, in a case that a subtask of a previous piece of task data at a current substructure is not completed and a subtask of a current piece of task data at a previous substructure is completed during the processing of each processing unit, a processing unit corresponding to a subtask of the current substructure to be released; and
calling, in a case that the processing unit corresponding to the subtask of the current substructure is released, the processing unit corresponding to the subtask of the current substructure to perform a subtask of the current piece of task data at the current substructure.

* * * * *